US012811725B2

(12) United States Patent
Pan et al.

(10) Patent No.: US 12,811,725 B2
(45) Date of Patent: Nov. 24, 2026

(54) METHOD AND COMMUNICATIONS APPARATUS FOR TRANSMITTING DATA PACKETS OF A MEDIA STREAM

(71) Applicant: Huawei Technologies Co., Ltd., Shenzhen (CN)

(72) Inventors: Qi Pan, Beijing (CN); Zhenglei Huang, Shenzhen (CN); Hui Ni, Beijing (CN); Yongcui Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 18/307,693

(22) Filed: Apr. 26, 2023

(65) Prior Publication Data

US 2023/0275698 A1 Aug. 31, 2023

Related U.S. Application Data

(63) Continuation of application No. PCT/CN2021/111709, filed on Aug. 10, 2021.

(30) Foreign Application Priority Data

Oct. 30, 2020 (CN) ......................... 202011194461.9

(51) Int. Cl.
*H04L 1/1607* (2023.01)
*H04L 5/00* (2006.01)

(52) U.S. Cl.
CPC .......... *H04L 1/1642* (2013.01); *H04L 5/0053* (2013.01)

(58) Field of Classification Search
CPC ... H04L 1/1642; H04L 5/0053; H04L 5/0044; H04L 5/0055; H04L 5/0058;
(Continued)

(56) References Cited

U.S. PATENT DOCUMENTS

2007/0097958 A1* 5/2007 Lappalainen ......... H04W 28/26 370/352
2012/0102131 A1* 4/2012 Lin ......................... H04L 67/61 709/217

(Continued)

FOREIGN PATENT DOCUMENTS

CN 101651826 A 2/2010
CN 101729228 A 6/2010

(Continued)

OTHER PUBLICATIONS

ITU-T H.264, Implementors Guide, Series H: Audiovisual and Multimedia Systems Coding of moving video. Implementors Guide for H.264: Advanced video coding for generic audiovisual services , Jul. 30, 2010, 15 pages.

(Continued)

*Primary Examiner* — Ian N Moore
*Assistant Examiner* — Latresa A McCallum
(74) *Attorney, Agent, or Firm* — WOMBLE BOND DICKINSON (US) LLP

(57) ABSTRACT

This application provides methods and communication apparatus for transmitting a data packet of a media stream. The method can include an access network element receiving M data packets of a media stream from a user plane network element. When a network resource of the access network element cannot satisfy a transmission requirement of a terminal device, the access network element drops N data packets with lower priorities in the M data packets, where N≤M. The access network element sends, to the terminal device, a data packet that is not dropped and sequence numbers that represent sending sequences of the data packets and that are carried in the N data packets, and receives, from the terminal device, an ACK feedback for the sequence numbers carried in the N data packets. In the (Continued)

solutions discussed herein, video playback experience on a user side can be substantially ensured.

15 Claims, 8 Drawing Sheets

(58) Field of Classification Search
CPC ....... H04L 5/0064; H04L 65/60; H04L 65/61; H04L 65/80; H04L 67/14; H04W 28/24; H04W 72/569; H04W 76/10; H04W 76/11; H04W 76/12
See application file for complete search history.

(56) References Cited

U.S. PATENT DOCUMENTS

| | | | | |
|---|---|---|---|---|
| 2014/0254351 | A1 | 9/2014 | Newman et al. | |
| 2015/0003242 | A1* | 1/2015 | Han | H04L 47/24 370/230 |
| 2016/0156748 | A1* | 6/2016 | Yang | H04W 76/22 370/328 |
| 2017/0346603 | A1* | 11/2017 | Koskinen | H04L 1/1858 |
| 2019/0132085 | A1* | 5/2019 | Shpiner | H04L 1/1806 |
| 2019/0379490 | A1* | 12/2019 | Liu | H04W 76/11 |
| 2020/0136980 | A1* | 4/2020 | Ying | H04L 67/56 |
| 2020/0137428 | A1 | 4/2020 | Zhang et al. | |
| 2021/0219357 | A1* | 7/2021 | Talebi Fard | H04L 47/28 |
| 2022/0150683 | A1* | 5/2022 | Zhou | H04L 67/14 |
| 2023/0189172 | A1* | 6/2023 | Qiao | H04W 36/0005 370/350 |
| 2023/0224253 | A1* | 7/2023 | Pan | H04L 47/34 370/235 |

FOREIGN PATENT DOCUMENTS

| | | | | | |
|---|---|---|---|---|---|
| CN | 105009498 | A | | 10/2015 | |
| CN | 106685604 | A | | 5/2017 | |
| CN | 109151612 | A | | 1/2019 | |
| EP | 2352248 | A1 | | 8/2011 | |
| EP | 3633997 | B1 | * | 8/2023 | H04N 21/64792 |

OTHER PUBLICATIONS

3GPP TS 23.502 V16.6.0 (Sep. 2020), 3rd Generation Partnership Project; Technical Specification Group Services and System Aspects; Procedures for the 5G System (5GS); Stage 2(Release 16), 597 pages.

3GPP TS 23.501 V16.6.0 (Sep. 2020), 3rd Generation Partnership Project; Technical Specification Group Services and System Aspects; System architecture for the 5G System (5GS); Stage 2(Release 16), 447 pages.

3GPP TS 29.244 V16.5.0 (Sep. 2020), 3rd Generation Partnership Project; Technical Specification Group Core Network and Terminals; Interface between the Control Plane and the User Plane Nodes; Stage 3 (Release 16), total 313 pages.

* cited by examiner

METHOD AND COMMUNICATIONS APPARATUS FOR TRANSMITTING DATA PACKETS OF A MEDIA STREAM

CROSS-REFERENCE TO RELATED APPLICATIONS

This application is a continuation of International Application No. PCT/CN2021/111709, filed on Aug. 10, 2021, which claims priority to Chinese Patent Application No. 202011194461.9, filed on Oct. 30, 2020. The disclosures of the aforementioned applications are hereby incorporated by reference in their entireties.

TECHNICAL FIELD

This application relates to the communications field, and more specifically, to a method for transmitting a data packet of a media stream and a communication apparatus.

BACKGROUND

A media stream is a main bearer stream in a 5th generation (5G) mobile network, and user media experience substantially determines experience of a mobile user on an entire mobile network service. In addition, the media are continuously developing into new media forms such as ultra-high-definition videos, 360-degree panoramic videos, and augmented reality (AR)/virtual reality (VR) videos. Fashionable control requirements such as instant switching and playback and fast adaptive bit rate switching impose increasingly strict requirements on latency and bandwidth. Only closed-loop control of a media service layer hardly satisfy media experience requirements of the user. Therefore, it is necessary to combine a network and media services to improve quality of service of the media service and optimize video experience of the user with network assistance.

In an existing video coding solution, a raw video stream obtained by encoding an original video stream by an encoder is to be transmitted in the network, and a video can be played only when the video stream reaches a user side. There is always a specific difference between media data in the video stream. For example, for the real-time transport protocol (RTP)/real-time messaging protocol (RTMP), live streams correspond to raw streams, namely, H.264 encoding streams, playback on a client heavily depends on intra (I) frames, and media decoding and playback can be performed only after the I frames arrive. Similarly, for a base layer and an enhancement layer in scalable video coding (SVC), and a background stream and a foreground stream in a VR/AR panoramic video, playback on a client depends on correct receiving of key data.

In a media stream transmission process, due to fluctuation of air interface network performance, a bandwidth requirement of the media stream cannot be satisfied, and timely and reliable transmission of a key data packet cannot be ensured. Consequently, video playback experience on the user side cannot be ensured.

SUMMARY

This application provides a method for transmitting a data packet of a media stream and a communication apparatus. When network performance is poor, only a data packet with a higher priority in the media stream is transmitted, and a data packet with a lower priority in the media stream is dropped, so that video playback experience on a user side can be substantially ensured.

According to a first aspect, a method for transmitting a data packet of a media stream is provided. The method includes: An access network element receives M data packets of a media stream from a user plane network element, where M is a positive integer, and each of the M data packets carries a sequence number representing a sending sequence of the data packet; when a network resource of the access network element cannot satisfy a transmission requirement of a terminal device, the access network element drops N data packets in the M data packets, where N≤M, N is an integer, and priorities of the N data packets are lower than priorities of other data packets in the M data packets; the access network element sends, to the terminal device, a data packet in the M data packets that is not dropped and sequence numbers carried in the N data packets; and the access network element receives, from the terminal device, an acknowledge (ACK) feedback for the sequence numbers carried in the N data packets.

It should be understood that after receiving the ACK feedback, the access network element sends the ACK feedback to a server (or an application server).

Optionally, the access network element receives an ACK feedback for each of the N data packets.

For example, an ACK feedback for a data packet may include a sequence number corresponding to the data packet.

Optionally, the access network element receives an ACK feedback for a data packet corresponding to a largest sequence number in the N data packets.

For example, the ACK feedback may include the sequence number of the data packet corresponding to the largest sequence number in the N data packets.

Optionally, the N data packets include one or more of the following: a data packet corresponding to last Q B frames or P frames in a group of pictures (GOP), a data packet corresponding to background stream data in the media stream, and a data packet corresponding to enhancement layer data in the media stream, where Q is a positive integer.

In the method for transmitting a data packet of a media stream provided in this application, in a case in which the network resource of the access network element cannot satisfy the transmission requirement of the terminal device, the access network element transmits a data packet (for example, a data packet corresponding to an I frame, base layer data, or foreground stream data) with a higher priority in the media stream, and drops a data packet (for example, the data packet corresponding to the B frame/P frame, the enhancement layer data, or the background stream data) with a lower priority in the media stream, so that it can be substantially ensured that the data packet with the higher priority is transmitted to the terminal device, that is, key data in the media stream reaches the terminal device. This improves video playback experience on a user side. In addition, because the terminal device performs ACK feedback on the N data packets, retransmission of the N data packets on a server side can be avoided, to avoid impact of the retransmission on transmission of the data packet with the higher priority, and further ensure the transmission of the data packet with the higher priority.

With reference to the first aspect, in some embodiments of the first aspect, the method further includes: The access network element receives, from the terminal device, first indication information for the sequence numbers carried in the N data packets, where the first indication information indicates that the terminal device receives no data packet corresponding to the sequence number.

It should be understood that, after receiving the first indication information, the access network element sends the first indication information to the server side.

Generally, if the server side receives an ACK feedback sent by the terminal device, it is considered that a data packet corresponding to the ACK feedback is correctly received by the terminal device. Therefore, it is considered that a network status is good, thereby increasing an amount of sent data. However, based on the solution provided in this application, the terminal device may perform ACK feedback on the data packet dropped by the access network element. As a result, if the server side increases an amount of sent data after receiving the ACK feedback sent by the terminal device, a network status may further worsen. The terminal device sends the first indication information, so that the server side can learn that the ACK feedback is a feedback for a data packet that is not received by the terminal device. Therefore, the server side may not consider a sending status of the data packet when evaluating the network status. In this way, to some extent, further worsening of the network status caused by an increase in the amount of sent data due to inaccurate evaluation of the network status that is performed by the server side can be avoided.

With reference to the first aspect, in some embodiments of the first aspect, the method further includes: The access network element receives, from the terminal device, length information of the data packet corresponding to the ACK feedback.

If the terminal device performs ACK feedback on each of the N data packets, length information corresponding to each ACK feedback is a length of the data packet. If the terminal device performs ACK feedback on the data packet with the largest sequence number in the N data packets, length information is a total length of the N data packets.

With reference to the first aspect, in some embodiments of the first aspect, each of the M data packets carries priority information.

Based on this solution, the access network element does not need to determine the priority of the data packet, so that an operation of the access network element can be simplified.

With reference to the first aspect, in some embodiments of the first aspect, before that an access network element receives M data packets of a media stream from a user plane network element, the method further includes: The access network element receives second indication information from the user plane network element or a session management network element, where the second indication information indicates that the user plane network element has received the media stream; and the access network element monitors, based on the second indication information, whether the network resource of the access network element can satisfy the transmission requirement of the terminal device.

Based on this solution, the access network element may monitor a status of the network resource according to an indication of the user plane network element, and drop the data packet with the lower priority in a timely manner, to ensure the transmission of the data packet with the higher priority.

With reference to the first aspect, in some embodiments of the first aspect, before that an access network element receives M data packets of a media stream from a user plane network element, the method further includes: The access network element receives a first message from the session management network element, where the first message includes media stream indication information, identification information, and transport layer indication information, the media stream indication information indicates the access network element to drop the data packet with the lower priority in the media stream when detecting that the network resource of the access network element cannot satisfy the transmission requirement of the terminal device, the identification information is used by the access network element to determine a priority of a received data packet of the media stream, and the transport layer indication information indicates the access network element to send, after dropping the data packet with the lower priority in the media stream, a sequence number representing a sending sequence of the dropped data packet to the terminal device.

According to a second aspect, a method for transmitting a data packet of a media stream is provided. The method includes: A user plane network element determines a priority of a received data packet of a media stream in the media stream based on the following information: whether the data packet is a data packet corresponding to last Q B frames or P frames in a group of pictures GOP, whether the data packet is a data packet corresponding to background stream data in the media stream, and whether the data packet is a data packet corresponding to enhancement layer data in the media stream, where Q is a positive integer; and the user plane network element sends, to an access network element, the data packet that carries priority information.

In the method provided in this application, the user plane network element determines the priority of the data packet of the media stream, and includes the priority information in the data packet, so that the access network element can send or drop the data packet based on the priority information of the data packet, to effectively ensure video playback experience on a user side.

With reference to the second aspect, in some embodiments of the second aspect, the data packet further carries a sequence number representing a sending sequence of the data packet.

With reference to the second aspect, in some embodiments of the second aspect, before that the user plane network element sends, to an access network element, the data packet that carries priority information, the method further includes: The user plane network element sends second indication information to the access network element, where the second indication information indicates that the user plane network element has received the media stream, so that the access network element monitors whether a network resource of the access network element can satisfy a transmission requirement of a terminal device.

With reference to the second aspect, in some embodiments of the second aspect, before that the user plane network element sends second indication information to the access network element, the method further includes: The user plane network element receives media stream indication information, identification information, and a packet detection rule (PDR) from a session management network element, where the media stream indication information indicates the access network element to drop a data packet with a lower priority in the media stream when the network resource of the access network element cannot satisfy the transmission requirement of the terminal device, the identification information is used by the access network element to determine a priority of a received data packet of the media stream, and the PDR is used by the user plane network element to detect the media stream.

According to a third aspect, a method for transmitting a data packet of a media stream is provided. The method includes: A terminal device receives, from an access network element, a sequence number representing a sending sequence of a data packet of a media stream; and if the terminal device receives no data packet corresponding to the sequence number, the terminal device sends an acknowledge ACK feedback to the access network element.

Generally, after successfully receiving a data packet, the terminal device performs ACK feedback, and a server side does not retransmit the data packet after receiving the ACK feedback. If the terminal device fails to receive a data packet, the terminal device does not perform ACK feedback. Correspondingly, if a server side receives no ACK feedback of the terminal device for a long period, the server side retransmits the data packet. In this application, if processing is performed in this conventional manner, because the terminal device does not receive a data packet dropped by the access network device, the terminal device does not perform ACK feedback on the data packet, and the server side retransmits the data packet. Consequently, when a network resource of the access network element cannot satisfy a transmission requirement of the terminal device, a network status may further worsen, and transmission of a data packet with a higher priority is affected.

However, according to the foregoing solution provided in this application, because the terminal device performs ACK feedback on the data packet, retransmission of the data packet on the server side can be avoided, to avoid impact of the retransmission on the transmission of the data packet with the higher priority, and ensure the transmission of the data packet with the higher priority.

With reference to the third aspect, in some embodiments of the third aspect, the method further includes: The terminal device sends first indication information to the access network element, where the first indication information indicates that the terminal device receives no data packet.

Generally, if the server side receives an ACK feedback sent by the terminal device, it is considered that a data packet corresponding to the ACK feedback is correctly received by the terminal device. Therefore, it is considered that a network status is good, thereby increasing an amount of sent data. However, based on the solution provided in this application, the terminal device may perform ACK feedback on the data packet dropped by the access network element. As a result, if the server side increases an amount of sent data after receiving the ACK feedback sent by the terminal device, the network status may further worsen. The terminal device sends the first indication information, so that the server side can learn that the ACK feedback is a feedback for a data packet that is not received by the terminal device. Therefore, the server side may not consider a sending status of the data packet when evaluating the network status. In this way, to some extent, further worsening of the network status caused by an increase in the amount of sent data due to inaccurate evaluation of the network status that is performed by the server side can be avoided.

With reference to the third aspect, in some embodiments of the third aspect, the method further includes: The terminal device sends, to the access network element, length information of the data packet corresponding to the ACK feedback.

According to a fourth aspect, a method for transmitting a data packet of a media stream is provided. The method includes: An application network element generates a first request message; and the application network element sends the first request message to a policy control network element, where the first request message includes media stream indication information and stream description information, where the media stream indication information indicates an access network element to drop a data packet with a lower priority in the media stream when a network resource of the access network element cannot satisfy a transmission requirement of a terminal device, and the stream description information describes a data feature of the media stream.

Based on this solution, the policy control network element may further provide information related to the media stream for a session management network element, so that the session management network element provides corresponding information for a user plane network element/the access network element/the terminal device. Therefore, the user plane network element/access network element/terminal device can subsequently perform corresponding optimization on the media stream based on the corresponding information, to ensure media stream service experience of a user.

With reference to the fourth aspect, in some embodiments of the fourth aspect, the first request message further includes transport layer indication information, where the transport layer indication information indicates the access network element to send, after dropping the data packet with the lower priority in the media stream, a sequence number representing a sending sequence of the dropped data packet to the terminal device.

According to a fifth aspect, a method for transmitting a data packet of a media stream is provided. The method includes: A policy control network element receives a first request message from an application network element, where the first request message includes media stream indication information and stream description information, the media stream indication information indicates an access network element to drop a data packet with a lower priority in the media stream when a network resource of the access network element cannot satisfy a transmission requirement of a terminal device, and the stream description information describes a data feature of the media stream; and the policy control network element sends a second response message to a session management network element, where the second response message includes the media stream indication information and a media stream data packet filter, the media stream indication information and the media stream data packet filter are used by the session management network element to generate a PDR, and the PDR is used by a user plane network element to detect the media stream.

Based on this solution, the session management network element may further provide corresponding information for the user plane network element/access network element/terminal device, so that the user plane network element/access network element/terminal device can subsequently perform corresponding optimization on the media stream based on the corresponding information, to ensure media stream service experience of a user.

With reference to the fifth aspect, in some embodiments of the fifth aspect, the first request message further includes transport layer indication information, and the second response message further includes the transport layer indication information, where the transport layer indication information indicates the access network element to send, after dropping the data packet with the lower priority in the media stream, a sequence number representing a sending sequence of the dropped data packet to the terminal device.

According to a sixth aspect, a method for transmitting a data packet of a media stream is provided. The method includes: A session management network element receives a second response message from a policy control network element, where the second response message includes media stream indication information and a media stream data packet filter, the media stream indication information indicates an access network element to drop a data packet with a lower priority in the media stream when a network resource of the access network element cannot satisfy a transmission requirement of a terminal device, the media stream indication information and the media stream data packet filter are used by the session management network element to generate a PDR, and the PDR is used by a user plane network element to detect the media stream; the session management network element sends a session establishment request message to the user plane network element, where the session establishment request message includes the media stream indication information, identification information, and the PDR, and the identification information indicates a priority indicated by priority information carried in the data packet of the media stream; and the session management network element sends the media stream indication information and the identification information to the access network element through an access and mobility management network element.

Based on this solution, the session management network element may separately provide corresponding information for the user plane network element, the access network element, and the terminal device, so that the user plane network element, the access network element, and the terminal device can subsequently perform corresponding optimization on the media stream based on the corresponding information, to ensure media stream service experience of a user.

With reference to the sixth aspect, in some embodiments of the sixth aspect, the method further includes: The session management network element sends the media stream indication information to the terminal device through the access and mobility management network element.

With reference to the sixth aspect, in some embodiments of the sixth aspect, the second response message further includes transport layer indication information, and the session management network element further sends the transport layer indication information to the access network element through the access and mobility management network element, where the transport layer indication indicates the access network element to send, after dropping the data packet with the lower priority in the media stream, a sequence number representing a sending sequence of the dropped data packet to the terminal device.

According to a seventh aspect, a communication apparatus is provided. The apparatus includes modules or units configured to perform the method according to any one of the first aspect to the sixth aspect, or includes modules or units configured to perform the method according to any one of the possible embodiments of the first aspect to the sixth aspect.

According to an eighth aspect, an apparatus is provided. The apparatus includes a processor. The processor is coupled to a memory, and may be configured to execute instructions in the memory, to enable the apparatus to perform the method according to any one of the first aspect to the sixth aspect, or perform the method according to any one of the possible embodiments of the first aspect to the sixth aspect. Optionally, the apparatus further includes the memory. Optionally, the apparatus further includes an interface circuit, and the processor is coupled to the interface circuit.

According to a ninth aspect, a processor is provided. The processor includes an input circuit, an output circuit, and a processing circuit. The processing circuit is configured to: receive a signal through the input circuit, and transmit a signal through the output circuit, to enable the processor to perform the method according to any one of the first aspect to the sixth aspect, or perform the method according to any one of the possible embodiments of the first aspect to the sixth aspect.

In some embodiments, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific embodiments of the processor and the various circuits are not limited in this embodiment of this application.

According to a tenth aspect, a processing apparatus is provided. The processing apparatus includes a processor and a memory. The processor is configured to: read instructions stored in the memory, receive a signal through a receiver, and transmit a signal through a transmitter, to perform the method according to any one of the first aspect to the sixth aspect, or perform the method according to any one of the possible embodiments of the first aspect to the sixth aspect.

Optionally, there are one or more processors, and there are one or more memories.

Optionally, the memory may be integrated with the processor, or the memory and the processor are separately disposed.

In some embodiments, the memory may be a non-transitory (non-transitory) memory, such as a read-only memory (ROM). The memory and the processor may be integrated into one chip, or may be disposed in different chips. A type of the memory and a manner in which the memory and the processor are disposed are not limited in this embodiment of this application.

The processing apparatus according to the tenth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to an eleventh aspect, a computer program product is provided. The computer program product includes a computer program (which may also be referred to as code or instructions). When the computer program is run, a computer is enabled to perform the method according to any one of the first aspect to the sixth aspect, or perform the method according to any one of the possible embodiments of the first aspect to the sixth aspect.

According to a twelfth aspect, a computer-readable medium is provided. The computer-readable medium stores a computer program (which may also be referred to as code or instructions). When the computer program is run on a computer, the computer is enabled to perform the method according to any one of the first aspect to the sixth aspect, or perform the method according to any one of the possible embodiments of the first aspect to the sixth aspect.

DESCRIPTION OF EMBODIMENTS

The following describes technical solutions in this application with reference to the accompanying drawings.

The technical solutions in embodiments of this application are applicable to various communication systems such as a long term evolution (LTE) system, an LTE frequency division duplex (FDD) system, an LTE time division duplex (TDD) system, a 5th generation (5G) system, a new radio (NR) system, or another communication system that may appear in the future.

Figure 1:
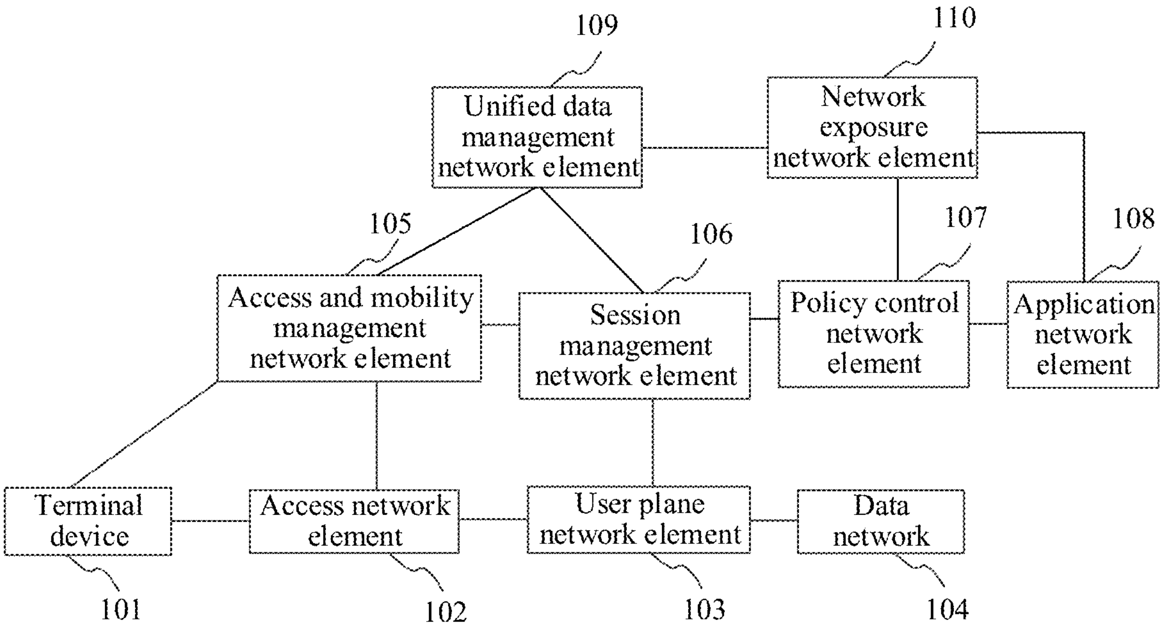
FIG. 1 is a schematic diagram of an architecture of a system that can be used in this application.

FIG. 1 is a diagram of an architecture of a system 100 that may be used in this application. As shown in FIG. 1, the system 100 may include one or more of the following devices: a terminal device 101, an access network element 102, a user plane network element 103, a data network 104, an access and mobility management network element 105, a session management network element 106, a policy control network element 107, an application network element 108, a unified data management network element 109, and a network exposure network element 110.

The terminal device 101 may be user equipment (UE), a user, an access terminal, a subscriber unit, a subscriber station, a mobile station, a remote station, a remote terminal, a mobile device, a user terminal, a terminal, a wireless communication device, a user agent, or a user apparatus, for example, may be a mobile phone, a tablet (pad), a computer having a wireless transceiver function, a virtual reality (VR) terminal device, an augmented reality (AR) terminal device, a wireless terminal in industrial control, a wireless terminal in self driving, a wireless terminal in a remote medical, a wireless terminal in a smart grid, a wireless terminal in transportation safety, a wireless terminal in a smart city (smart city), a wireless terminal in a smart home, or the like. The terminal device 110 may alternatively be an apparatus or a circuit structure disposed in the foregoing various devices, for example, a chip or a chip system.

The access network element 102 can manage a radio resource, provide an access service for the terminal device, and further complete forwarding of a control signal and user data between the terminal device and a core network.

The access network element 102 may be a transmission reception point (TRP), an evolved NodeB (e.g., eNB or eNodeB) in an LTE system, a home base station (for example, home evolved NodeB or home NodeB, HNB), a baseband unit (BBU), a radio controller in a cloud radio access network (CRAN) scenario, a relay station, an access point, a vehicle-mounted device, a wearable device, a next generation NodeB (gNB) in a 5G mobile communication system, an access network element in a future evolved public land mobile network (PLMN), an access point (AP), or the like.

The user plane network element 103 is mainly responsible for data packet routing and forwarding.

The data network 104 may be a carrier service, internet access, or a third-party service, for example, an IP multimedia service (IMS) or the internet. The DN may include an application server (AS). The AS is a software framework, provides an environment in which an application program is run, and is configured to provide the application program with services such as security, data, transaction support, load balancing, and large-scale distributed system management. The terminal device obtains an application packet by communicating with the AS.

The access and mobility management network element 105 is mainly responsible for mobility management in a mobile network, for example, user location update, user network registration, and user handover.

The session management network element 106 is mainly responsible for session management in the mobile network, for example, session establishment, modification, and release. Specific functions may be allocating an IP address to a user, selecting a user plane network element that provides a packet forwarding function, and the like.

The policy control network element 107 is responsible for providing the access and mobility management network element and the session management network element with policies such as a quality of service (QoS) policy and a slice selection policy.

The application network element 108 is responsible for providing a service for a 3GPP network, interacting with the policy control network element to perform policy control, and the like.

The unified data management network element 109 is configured to store user data such as subscription information and authentication/authorization information.

The network exposure network element 110 provides a framework, authentication, and an interface that are related to network capability exposure, and transfers information between a 5G system network function and another network function.

It should be understood that the foregoing devices or network elements may be apparatuses with corresponding functions, or may be software/hardware modules (for example, chips) inside the apparatuses, or the like. It should be further understood that any device or network element in this application may be implemented in a form of software or a combination of software and hardware.

Figure 2:
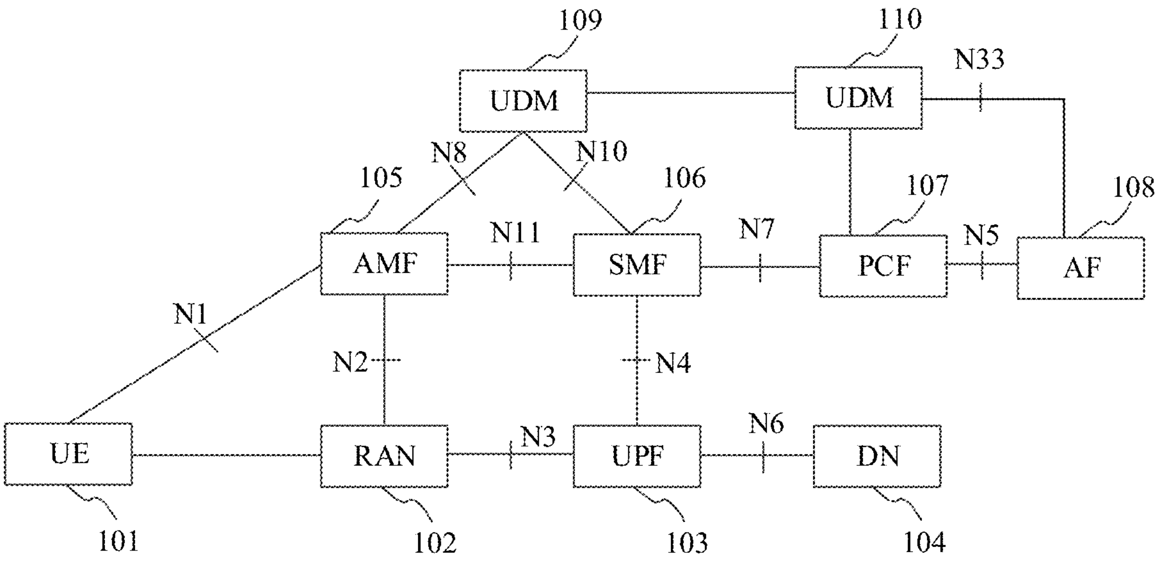
FIG. 2 is a schematic diagram of an architecture of a 5G system that can be used in this application.

In an example, the system 100 shown in FIG. 1 may be a 5G system shown in FIG. 2. It should be understood that the system 100 may alternatively be a 4G system or another system. This is not limited in this application.

FIG. 2 is a schematic diagram of an architecture of a 5G system. In the diagram of the architecture of the system, a network element that has a same reference numeral as that in FIG. 1 is a name of a corresponding network element in FIG. 1 in the current 5G system. Refer to FIG. 2. The architecture of the 5G system may include one or more of the following network elements: UE 101, a (radio) access network ((radio) access network, (R)AN) 102, a user plane function (UPF) 103, a data network (DN) 104, an access and mobility management function (AMF) 105, a session management function (SMF) 106, a policy control function (PCF) 107, an application function (AF) 108, a unified data management (UDM) 109, and a network exposure function 110.

It should be understood that a name of each network element shown in FIG. 2 is merely a name, and the name constitutes no limitation on a function of the network element. In different networks, the foregoing network elements may alternatively have other names. This is not specifically limited in embodiments of this application. For example, in a 6G network, some or all of the foregoing network elements may still use terms in 5G, or may use other names. Similarly, interfaces between the network elements shown in FIG. 2 are merely examples. In a 5G network and another future network, interfaces between network elements may alternatively not be the interfaces shown in the figure. This is not limited in this application.

It should be further understood that embodiments of this application are not limited to the architecture of the system shown in FIG. 2. For example, a communication system to which this application is applicable may include more or fewer network elements or devices. The devices or the network elements in FIG. 2 may be hardware, or may be software obtained through function division or a combination of the hardware and the software. The devices or the network elements in FIG. 2 may communicate with each other through another device or network element.

With rapid development of a new media industry, new requirements for communication technologies are raised. A surging amount of data in the media industry, especially emergence of new media streams such as ultra-high-definition videos and VR panoramic videos, imposes an unprecedented challenge to a network transmission capability. In a 5G technology, real-time high-definition rendering in the media industry can be implemented, and requirements of a device on a local computing capability can be greatly reduced, a large amount of data can be transmitted in real time, and network latency can be reduced. This satisfies requirements of ultra-high-definition live streaming, and enables AR/VR applications that have high requirements on image quality and latency to develop rapidly.

From a perspective of a network layer, a media stream is a main bearer stream in a mobile network, and user media experience determines experience of a mobile user on an entire mobile network service to a large extent. From a perspective of a service layer, the media are continuously developing into new media forms such as ultra-high-definition videos and 360-degree panoramic videos/VR videos. New control requirements such as instant switching and playback and fast adaptive bit rate switching impose increasingly strict requirements on latency and bandwidth. Only closed-loop control of the media service layer cannot satisfy media experience requirements of the user. Therefore, it is necessary to combine a network and a media service to improve quality of service of the media service and optimize video experience of the user through network assistance, especially for AR/VR panoramic video streams and 4K/8K ultra-high-definition video streams.

In a plurality of existing video coding solutions including H.264/advanced video coding (AVC), high efficiency video compression coding (HEVC), and SVC/scalability extension of high efficiency video coding (SHVC), a raw video stream obtained by encoding an original video stream by an encoder is to be transmitted in the network, and a video can be played when the video stream reaches a user side. Data stream information usually includes an I frame, a predictive (P) frame, and a bi-directional interpolated prediction (B) frame. The I frame is an image frame that can be completely decoded by using data in the frame. The P frame is an image frame on which video decoding can be completed with reference to content of a previous frame. The B frame is an image frame that can be completely decoded with reference to content of a previous frame and a next frame. Therefore, the I frame plays an important role in a media stream transmission and playback process. The user side can completely decode and play a video only after receiving the I frame. Similarly, a base layer (also referred to as base layer data) and an enhancement layer (also referred to as enhancement layer data) in SVC coding are further included, and a foreground stream (also referred to as foreground stream data) and a background stream (also referred to as background stream data) that are commonly used in an AV/VR video service currently are also included. The base layer includes basic and most important information of a video signal. After receiving the base layer, a receiving end can obtain an image with basic quality through reconstruction. The enhancement layer includes detail information of the video signal, and the receiving end decodes the base layer and the enhancement layer together to obtain an image with higher quality through reconstruction. To ensure media viewing experience of the user and reduce network transmission bandwidth, in a transmission process of an AR/VR video stream, the AR/VR video stream is classified into a panoramic background stream with lower image quality and a foreground stream that is with high image quality and that corresponds to a user's field of view. In this case, reliable transmission and decoding of the foreground stream are particularly important for assurance of user experience.

In a media stream transmission process, due to fluctuation of air interface network performance, a bandwidth requirement of the media stream cannot be satisfied, and timely and reliable transmission of a key data packet (for example, a data packet corresponding to the I frame, the base layer data, or the foreground stream data) cannot be ensured. Consequently, video playback experience on the user side cannot be ensured.

In view of this, this application provides a method for transmitting a data packet of a media stream. When network performance is poor, only a data packet (for example, a data packet corresponding to an I frame, base layer data, or foreground stream data) with a higher priority in the media stream is transmitted, and a data packet (for example, a data packet corresponding to a B frame/P frame, enhancement layer data, or background stream data) with a lower priority in the media stream is dropped, so that video playback experience on a user side can be ensured to a large extent.

The following describes solutions of this application in detail with reference to accompanying drawings.

Figure 3:
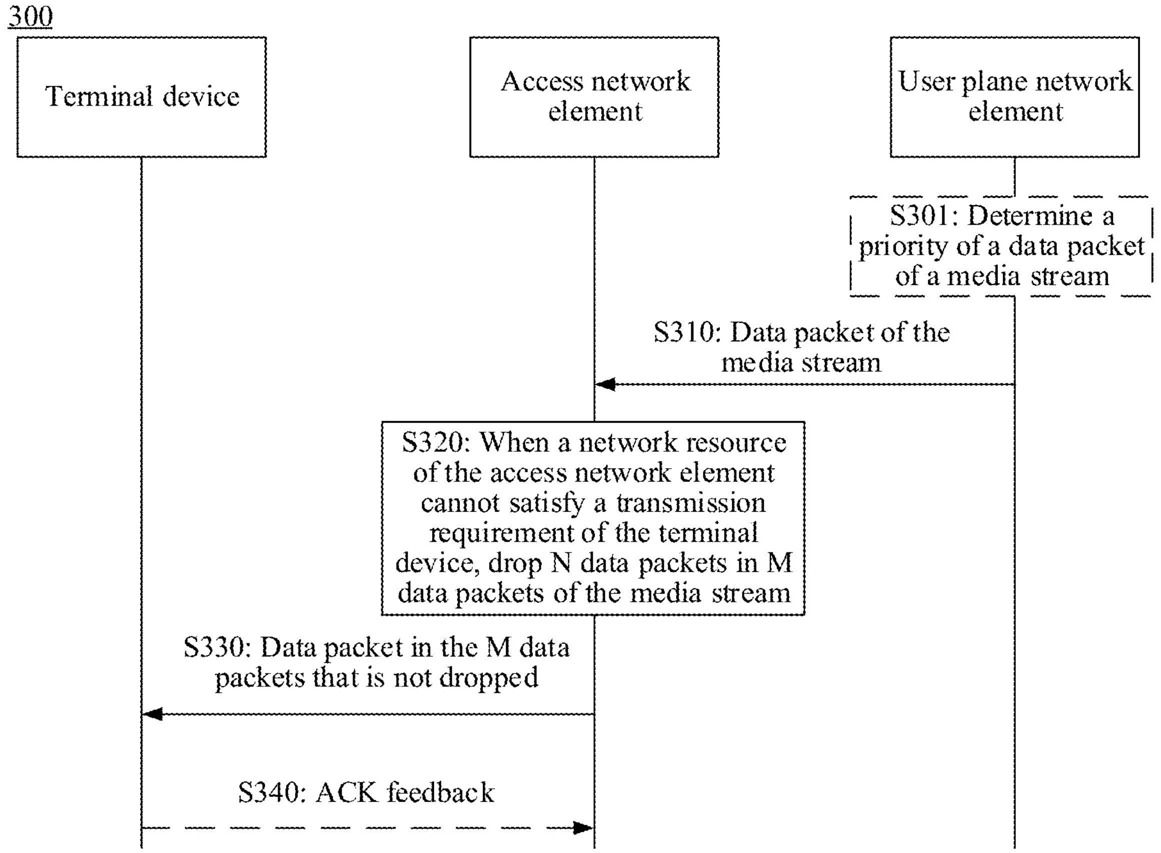
FIG. 3 is a schematic flowchart of a method for transmitting a data packet of a media stream according to this application.

FIG. 3 is a schematic flowchart of a method for transmitting a data packet of a media stream according to this application. The following describes operations in the method 300.

S310: A user plane network element sends a data packet of a media stream to an access network element.

S320: When a network resource of the access network element cannot satisfy a transmission requirement of a terminal device, the access network element drops N data packets in M data packets of the media stream, where $N \leq M$, and both M and N are integers.

It should be understood that the M data packets are data packets of the media stream that are sent by the user plane network element to the access network element and that have not been sent by the access network element to the terminal device currently. That is, the M data packets are data packets of the media stream that are currently buffered by the access network element. The N data packets are a part or all of the data packets of the media stream that are currently buffered by the access network element.

Priorities of the N data packets are lower than priorities of other data packets in the M data packets. For example, it is assumed that the M data packets are a data packet #1 to a data packet #5, and priorities of the data packet #1 to the data packet #5 are respectively 1, 1, 2, 3, and 2. A larger number indicates a higher priority. In this case, the N data packets may be data packets whose priorities are 1, namely, the data packet #1 and the data packet #2; or the N data packets may be data packets whose priorities are 1 and 2, namely, the data packet #1, the data packet #2, the data packet 3, and the data packet #5; or the N data packets may be the data packet #1 to the data packet #5.

Optionally, a value of N may be determined based on the network resource of the access network element. For example, only data of 1M can be sent on the network resource of the access network element, but the access network element currently buffers data of 5M. In this case, a total size of the N data packets may be 4M.

Optionally, the N data packets may include one or more of the following: a data packet corresponding to last Q B frames or P frames in a GOP, a data packet corresponding to background stream data in the media stream, and a data packet corresponding to enhancement layer data in the media stream, where Q is a positive integer.

For example, a data packet corresponding to the last B frame may be first dropped, and then data packets corresponding to the P frames may be dropped in a sequence of dropping the data packets corresponding to the P frames from back to front. For example, it is assumed that the M data packets correspond to two GOPs in total, and each GOP includes the following frames: I P P P B P. Therefore, if a total quantity of data packets corresponding to the two B frames in the two GOPs is N, the B frames in the two GOPs may be dropped. If a total quantity of data packets corresponding to the two B frames in the two GOPs is N−4, and a quantity of data packets corresponding to the last P frame in each GOP is 2, the B frames in the two GOPs and the last P frame may be dropped.

For another example, assuming that the media stream adopts SVC coding, the data packet of the media stream may correspond to either base layer data or the enhancement layer data, that is, any data packet of the media stream either corresponds to the base layer data or corresponds to the enhancement layer data. A priority of the base layer data is higher than a priority of the enhancement layer data. In this case, the N data packets may be data packets corresponding to the enhancement layer data in the M data packets.

For another example, assuming that the media stream is an AV/VR video service, the data packet of the media stream may correspond to either foreground stream data or the background stream data, where a priority of the foreground stream data is higher than a priority of the background stream data. In this case, the N data packets may be data packets corresponding to the background stream data in the M data packets.

S330: The access network element sends, to the terminal device, a data packet in the M data packets that is not dropped.

For example, the M data packets are the data packet #1 to the data packet #5, and the N data packets are the data packet #1 and the data packet #2. In this case, the access network element drops the data packet #1 and the data packet #2, and sends the data packet #3 to the data packet #5 to the terminal device.

In conclusion, in the method for transmitting a data packet of a media stream provided in this application, in a case in which the network resource of the access network element cannot satisfy the transmission requirement of the terminal device, the access network element transmits a data packet (for example, a data packet corresponding to an I frame, the base layer data, or the foreground stream data) with a higher priority in the media stream, and drops a data packet (for example, the data packet corresponding to the B frame/P frame, the enhancement layer data, or the background stream data) with a lower priority in the media stream, so that it can be substantially ensured that the data packet with the higher priority is transmitted to the terminal device, that is, key data in the media stream reaches the terminal device. This improves video playback experience on a user side.

In an embodiment of this application, before S310 is performed, the method may further include:

S301: The user plane network element determines a priority of the data packet of the media stream. Correspondingly, the data packet sent by the user plane network element may carry priority information indicating the priority of the data packet.

For example, the user plane network element may determine the priority of the data packet of the media stream based on the following information: whether the data packet is a data packet corresponding to last Q B frames or P frames in one GOP, whether the data packet is a data packet corresponding to the background stream data in the media stream, and whether the data packet is a data packet corresponding to the enhancement layer data in the media stream, where Q is a positive integer.

For example, priorities of different frames in one GOP depend on criticality of the frames to decoding experience of the entire GOP. For example, the last B frame is a last decoded media frame, in other words, the B frame does not affect decoding of other media in the GOP. Therefore, a priority of the B frame may be set to the lowest. For example, if a frame sequence in one GOP is I P P B P, priorities of the frames may be defined as 5, 4, 3, 1, and 2 respectively, where a larger value indicates a higher priority. Correspondingly, priorities corresponding to data packets of all the frames are 5, 4, 3, 1, and 2 in sequence.

For example, priorities corresponding to an I frame in one GOP, last Q B frames in one GOP, and last Q P frames in one GOP are respectively 2, 1, and 1. If one data packet corresponds to the I frame in the GOP, a priority of the data packet is 2. If one data packet corresponds to the last Q B frames or P frames in the GOP, a priority of the data packet is 1.

For example, a priority of the foreground stream data in the media stream is higher than a priority of the background stream data. For example, the priority of the foreground stream data is 2, and the priority of the background stream data is 1. A larger value indicates a higher priority. In this case, if data corresponding to one data packet is the foreground stream data, a priority of the data packet is 2. If data corresponding to one data packet is the background stream data, a priority of the data packet is 1.

For example, a priority of the base layer data in the media stream is higher than a priority of the enhancement layer data. For example, the priority of the base layer data is 2, and the priority of the enhancement layer data is 1. A larger value indicates a higher priority. In this case, if data corresponding to one data packet is the base layer data, a priority of the data packet is 2. If data corresponding to one data packet is the enhancement layer data, a priority of the data packet is 1.

It should be understood that a value indicating the priority is not limited in this application.

When determining the priority of the data packet based on the foregoing solution, the user plane network element needs to learn whether the data packet specifically corresponds to an I frame, a P frame, or a B frame in one GOP, and further needs to learn of a sequence number of the frame in the GOP corresponding to the data packet. Alternatively, the user plane network element needs to learn whether the data packet is specifically the background stream data or the foreground stream data. Alternatively, the user plane network element needs to learn whether the data packet is specifically the base layer data or the enhancement layer data. For example, in one manner, the user plane network element may learn of the foregoing information by parsing a data part, namely, a payload, in the data packet, to further determine the priority of the data packet. In another manner, the user plane network element may learn of the foregoing information based on information carried in a header of the data packet, to further determine the priority of the data packet.

After the user plane network element determines the priority of the data packet of the media stream, the user plane network element may further include the priority information of the data packet to the data packet, that is, include information indicating the priority of the data packet to the data packet. Correspondingly, the data packet received by the access network element carries the corresponding priority information.

Based on this solution, the user plane network element determines the priority of the data packet of the media stream, and includes the priority information in the data packet, so that the access network element can send or drop the data packet based on the priority information of the data packet, to effectively ensure the video playback experience on the user side.

It is to be noted that, the priority of the data packet of the media stream may alternatively be determined by the access network element or an application network element that sends the data packet. For a manner in which the access network element or the application network element determines the priority, refer to a manner in which the user plane network element determines the priority. Details are not described herein again.

In an embodiment of this application, the data packet of the media stream may further carry a sequence number representing a sending sequence of the data packet.

Correspondingly, when sending the data packet in the M data packets that is not dropped to the terminal device, the access network element may further send sequence numbers carried in the N data packets. In addition, in this scenario, the method may further include:

S340: The terminal device sends, to the access network element, an ACK feedback for the sequence numbers carried in the N data packets.

For example, in one manner, the terminal device may send one ACK feedback for a sequence number carried in each of the N data packets. In this manner, a server side considers that each of the N data packets is correctly received by the terminal device side. In another manner, the terminal device may send only one ACK feedback, and the ACK feedback is a feedback for a largest sequence number in the sequence numbers carried in the N data packets. In this manner, a server side considers that a data packet corresponding to the largest sequence number and data packets whose sequence numbers are less than the largest sequence number are correctly received by the terminal device.

Generally, after successfully receiving a data packet, the terminal device performs ACK feedback, and the server side does not retransmit the data packet after receiving the ACK feedback. If the terminal device fails to receive a data packet, the terminal device does not perform ACK feedback. Correspondingly, if the server side receives no ACK feedback of the terminal device for a long period, the server side retransmits the data packet. In this application, if processing is performed in this conventional manner, because the terminal device receives no N data packets dropped by the access network device, the terminal device does not perform ACK feedback on the N data packets, and the server side retransmits the N data packets. Consequently, when the network resource of the access network element cannot satisfy the transmission requirement of the terminal device, a network status may further worsen, and transmission of a data packet with a higher priority is affected.

However, according to the foregoing solution provided in this application, because the terminal device performs ACK feedback on the N data packets, retransmission of the N data packets on the server side can be avoided, to avoid impact of the retransmission on transmission of the data packet with the higher priority, and ensure the transmission of the data packet with the higher priority.

It should be understood that the sequence number may be a transmission control protocol (TCP) sequence number, or may be other information that may represent the sending sequence of the data packet. This is not limited in this application.

Optionally, when sending, to the terminal device, the sequence numbers carried in the N data packets, the access network element may further send length information of the data packets corresponding to the sequence numbers. In addition, when sending, to the access network element, the ACK feedback for the sequence numbers carried in the N data packets, the terminal device may further send the length information. Correspondingly, the access network element sends the length information to the server side.

If the terminal device performs ACK feedback on each of the N data packets, length information corresponding to each ACK feedback is a length of the data packet. If the terminal device performs ACK feedback on the data packet with the largest sequence number in the N data packets, length information is a total length of the N data packets.

For example, it is assumed that the sequence numbers of the N data packets are 0 and 1. In a manner, the terminal device may perform ACK feedback on a data packet whose sequence number is 0 and feed back length information (for example, 200 bytes) of the data packet whose sequence number is 0, and the terminal device may perform ACK feedback on a data packet whose sequence number is 1 and feed back length information (for example, 201 bytes) of the data packet whose sequence number is 1. In another manner, the terminal device may perform ACK feedback on only a data packet whose sequence number is 1, and feed back length information of the data packet. The length information is a total length (for example, 401 bytes) of two data packets whose sequence numbers are 0 and 1.

Optionally, the method may further include the following operations.

S350: The terminal device sends first indication information to the access network element, where the first indication information indicates that the terminal device has not received the data packets corresponding to the sequence numbers corresponding to the ACK feedback.

After receiving the first indication information, the access network element sends the first indication information to the server side.

Generally, if the server side receives an ACK feedback sent by the terminal device, it is considered that a data packet corresponding to the ACK feedback is correctly received by the terminal device. Therefore, it is considered that a network status is good, thereby increasing an amount of sent data. However, based on the solution provided in this application, the terminal device may perform ACK feedback on the data packet dropped by the access network element. As a result, if the server side increases an amount of sent data after receiving the ACK feedback sent by the terminal device, the network status may further worsen. The terminal device sends the first indication information, so that the server side can learn that the ACK feedback is a feedback for a data packet that is not received by the terminal device. Therefore, the server side may not consider a sending status of the data packet when evaluating the network status. In this way, to some extent, further worsening of the network status caused by an increase in the amount of sent data due to inaccurate evaluation of the network status that is performed by the server side can be avoided.

An example in which the solutions of this application are applied to the 5G system shown in FIG. 2 is used below to describe in detail embodiments provided in this application. An AF, an AS and the foregoing server can be interchanged. It should be understood that when the solutions of this application are applied to another system, network elements in FIG. 4A to FIG. 7 are corresponding network elements in the corresponding system.

Figure 4A:
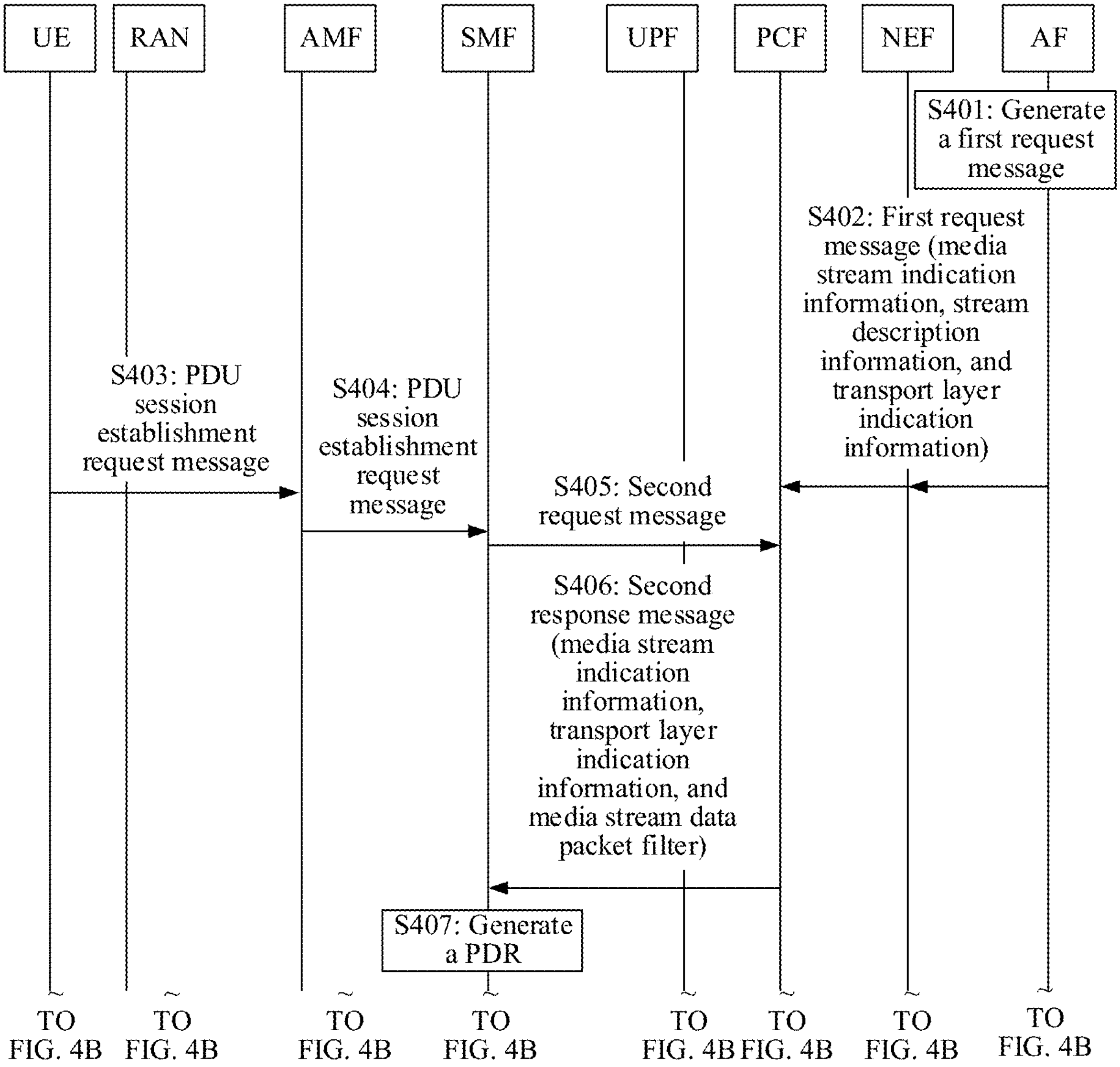
FIG. 4A and FIG. 4B are a schematic diagram of a PDU session establishment process according to this application.
Figure 4B:
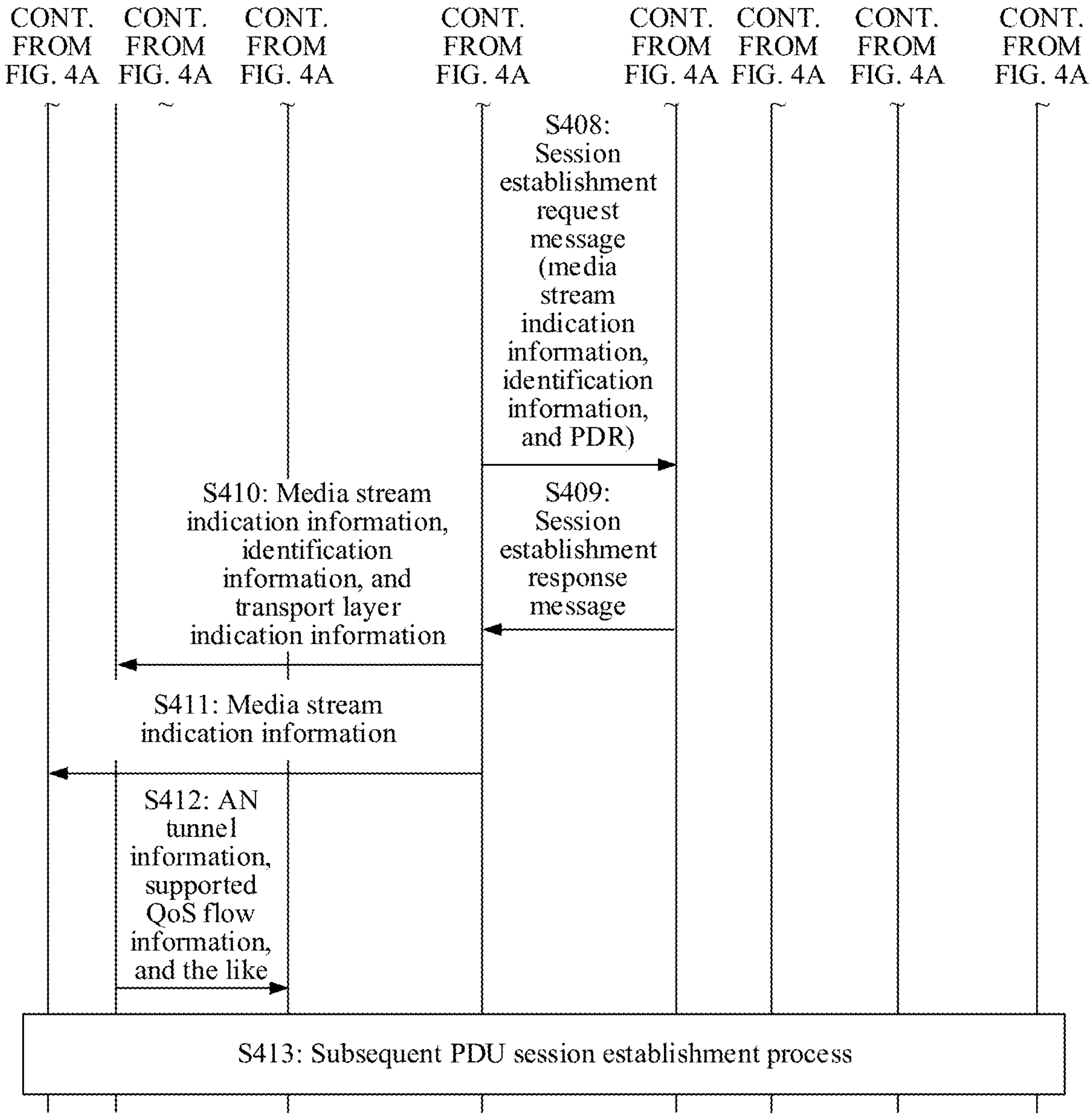

FIG. 4A and FIG. 4B are a schematic diagram of a PDU session establishment process. The process may be a process of establishing a PDU session when a TCP transport protocol is used for a media stream. However, this is not limited in this application. After the PDU session is established through the process shown in FIG. 4A and FIG. 4B, a data packet of the media stream may be transmitted through a process shown in FIG. 5. A method 500 shown in FIG. 5 corresponds to the foregoing solution in which the sequence number is carried in the data packet. The following describes operations in the process shown in FIG. 4A and FIG. 4B.

S401: An AF generates a first request message.

S402: The AF sends the first request message to a PCF through an NEF. Accordingly, the PCF receives the first request message from the AF through the NEF. The NEF is optional. If the AF is in a trusted zone of a network, the NEF is not required. Otherwise, the AF needs to interact with the PCF through the NEF.

The first request message includes media stream indication information, stream description information, and transport layer indication information.

The stream description information describes a data feature of one data stream. In this application, the data stream is the media stream. For example, the stream description information may include one or more of the following: an IP address of a terminal device, a transport layer port of the terminal device, an IP address of a server, a transport layer port of the server, and a transport layer protocol type.

The media stream indication information indicates that the data stream described by the stream description information is the media stream. Further, the media stream indication information may further indicate an access network element to drop a data packet with a lower priority in the media stream when a network resource of the access network element cannot satisfy a transmission requirement of the terminal device.

The transport layer indication information indicates the RAN to send, after dropping the data packet with the lower priority in the media stream, a sequence number representing a sending sequence of the dropped data packet to the UE.

For example, the first request message may be an AF request message, and a specific service message may be an Nnef_ServiceParameter_Create/Update/Delete request.

S403: The UE sends a PDU session establishment request message to an AMF. Accordingly, the AMF receives the PDU session establishment request message from the UE.

Specifically, when establishing the PDU session, the UE sends the PDU session establishment request message to the AMF side. The PDU session establishment request message is included in a NAS message sent by the UE to the AMF.

S404: The AMF sends the received PDU session establishment request message to an SMF.

For example, the AMF may send the received PDU session establishment request message to the SMF via an Nsmf_PDUSession_CreateSMContext service, to establish a PDU S405: After receiving the PDU session establishment request message, the SMF may send a second request message to the PCF. Accordingly, the PCF receives the second request message from the SMF.

The second request message is used to initiate session management policy association establishment, to request to establish session management policy association between the SMF and the PCF.

S406: The PCF sends a second response message to the SMF. Accordingly, the SMF receives the second response message from the PCF.

After receiving the second request message, the PCF may return, to the SMF, the media stream indication information, the transport layer indication information, and a media stream data packet filter that are from the AF. In addition, the PCF may further send a policy and charging control (PCC) rule of the PDU session to the SMF.

S407: The SMF generates a PDR based on the media stream indication information and the media stream data packet filter.

The PDR is used to detect the media stream described by the stream description information.

S408: The SMF sends a session establishment request message to a UPF.

The session establishment request message may include the media stream indication information, identification information, and the PDR. The identification information indicates a priority indicated by priority information carried in the data packet of the media stream.

It should be understood that after subsequently receiving the data packet of the media stream, the UPF may include, in the data packet based on the identification information, the priority information indicating the priority of the data packet.

For example, the session establishment request message may be an N4 session establishment request message. N4 is an interface between the SMF and the UPF.

S409: The UPF sends a session establishment response message to the SMF.

For example, the session establishment response message may be an N4 session establishment response message.

S410: The SMF sends the media stream indication information, the identification information, and the transport layer indication information to the RAN.

S411: The SMF sends the media stream indication information to the UE.

For example, the SMF may include the media stream indication information in an N1 SM message, include the media stream indication information, the identification information, and the transport layer indication information in an N2 SM message, and send the N1 SM message and the N2 SM message to the AMF side via an Namf_Communication_N1N2MessageTransfer service. Then, the AMF sends, to the RAN side via an N2 PDU session request service, the NAS information that is sent to the UE and the N2 SM message that is sent to the RAN. Then, the RAN sends, to the UE side, NAS downlink information that is from the AMF.

After receiving the information sent by the SMF, the RAN and the UE may store the information, and perform corresponding processing after subsequently receiving the data packet of the media stream. For example, when the network resource of the RAN cannot satisfy the transmission requirement of the terminal device, the RAN may drop the data packet with the lower priority. The UE may perform ACK feedback on the sequence number corresponding to the dropped data packet. It should be understood that a sequence of S410 and S411 is not limited in this application.

S412: The RAN notifies the AMF of corresponding AN tunnel information, supported QoS flow information, and the like.

For example, the RAN may use an N2 PDU session response service to notify the AMF of the corresponding AN tunnel information, the supported QoS flow information, and the like.

S413: Perform a subsequent PDU session establishment process.

For the subsequent PDU session establishment process, refer to a conventional technology, for example, operations 15 to 21 in the PDU session establishment process shown in Figure 4.3.2.2.1-1 in TS 23.502. Details are not described in this specification again.

In conclusion, based on the PDU session establishment process provided in this application, in the PDU session establishment process, the AF may send information related to the media stream to the PCF, and the PCF interacts with the SMF, so that the SMF can send corresponding information of the media stream to the UE/RAN/UPF during session establishment, to ensure that the UE/RAN/UPF can subsequently perform corresponding optimization on the media stream described by the stream description information provided by the AF, so as to ensure media stream service experience of a user.

Figure 5:
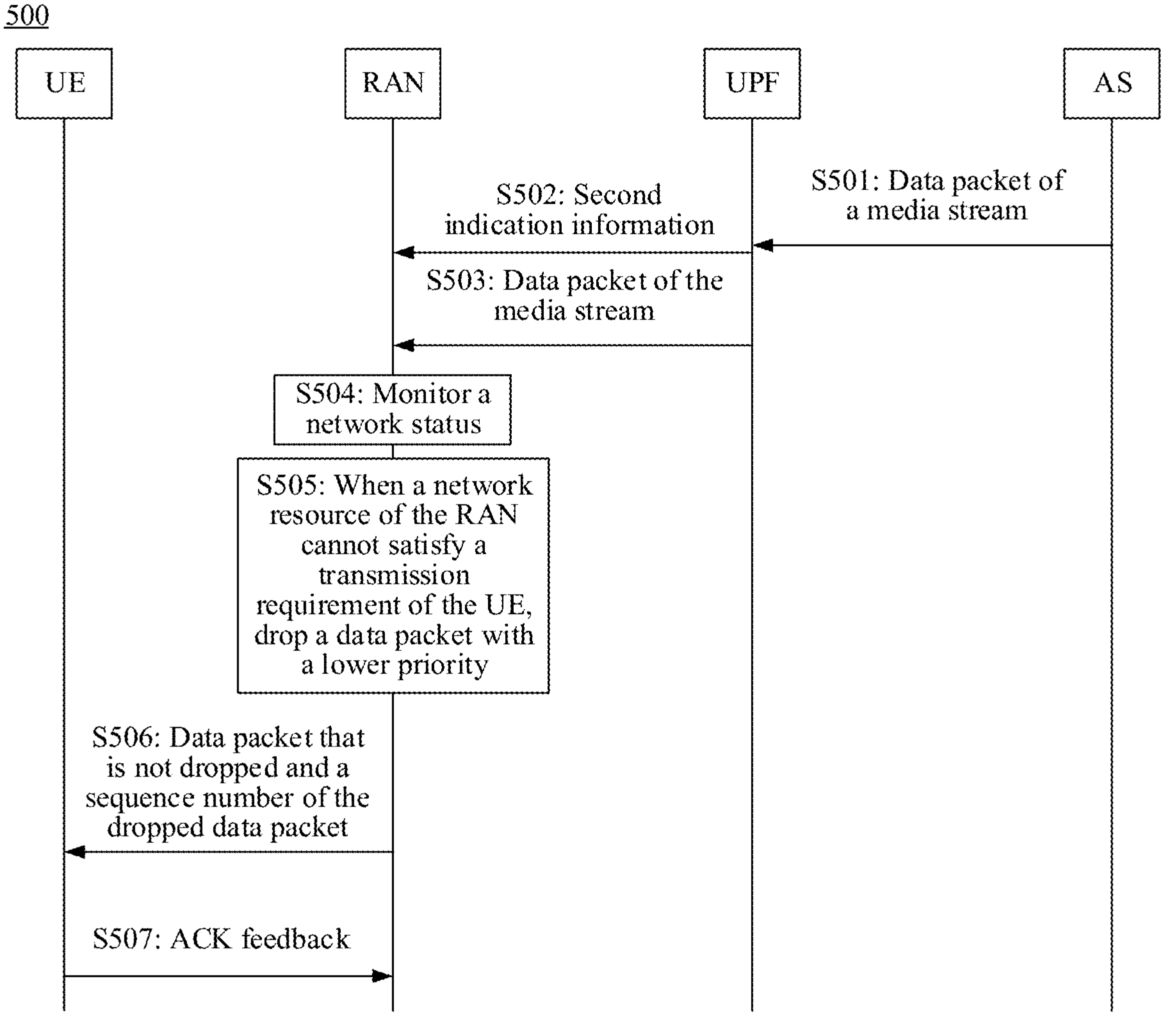
FIG. 5 is a schematic flowchart of another method for transmitting a data packet of a media stream according to this application.

FIG. 5 is a specific embodiment of a method for transmitting a data packet of a media stream according to this application. The following describes operations in the method 500 shown in FIG. 5.

S501: An AS sends a data packet of a media stream described by stream description information.

The data packet carries a sequence number representing a sending sequence of the data packet. For example, the data packet may carry a TCP sequence number.

Optionally, the data packet may further carry type information. For example, a TCP/IP header of the data packet may carry the type information. The type information indicates whether the data packet corresponds to an I frame, a P frame, or a B frame in one GOP, and may further indicate a sequence number of the frame in the GOP corresponding to the data packet. Alternatively, the type information indicates whether the data packet is background stream data or foreground stream data. Alternatively, the type information indicates whether the data packet is base layer data or enhancement layer data.

Optionally, the data packet may further carry priority information. For example, the TCP/IP header of the data packet may carry the priority information. The priority information indicates a priority of the data packet. As described above, for a manner in which the AS determines the priority of the data packet, refer to a manner in which the UPF determines the priority of the data packet.

S502: After detecting that the received data packet is the data packet of the media stream, the UPF sends second indication information to a RAN. Accordingly, the RAN receives the second indication information.

In one manner, the UPF may send the second indication information in a control plane manner. For example, the UPF may report the second indication information through an N4 session, and then an SMF sends the second indication information to the RAN via an N2 SM message.

In another manner, the UPF may send the second indication information in a data plane manner. For example, when receiving the 1st data packet of the media stream, the UPF may include the second indication information in a GPRS tunneling protocol (GTP) layer of the 1st data packet, and send the second indication information to the RAN.

S503: The UPF sends the data packet to the RAN.

Optionally, the data packet may carry the priority information.

As described above, in the first manner, the UPF may independently determine the priority of the data packet. Specifically, the UPF may parse the data packet, then determine the priority of the data packet, and finally include the priority information in the data packet.

In the second manner, the AS determines the priority of the data packet, and then includes the priority information in the header of the data packet. The UPF may obtain the priority information from the packet header of the data packet. After obtaining the priority information provided by the AF, the UPF includes, in the data packet based on the identification information provided by the SMF in operation S408 in the PDU session establishment process, the priority information that can be identified by the RAN.

For example, the UPF may include the priority information in a GTP layer of the data packet.

S504: After receiving the second indication information, the RAN starts to monitor a current network status.

Specifically, after receiving the second indication information, the RAN starts to detect whether a network resource of the RAN can satisfy a transmission requirement of UE.

S505: When the network resource of the RAN cannot satisfy the transmission requirement of the UE, the RAN drops a data packet with a lower priority.

For details of this operation, refer to S320. Details are not described herein again.

It is to be noted that, if the data packet received by the RAN does not carry the priority information, the RAN may determine the priority of the data packet. For a specific determining manner, refer to the foregoing described manner in which the UPF determines the priority of the data packet.

S506: The RAN sends, to the UE, a data packet that is not dropped in M data packets, and sends sequence numbers carried in N dropped data packets.

For example, the RAN may send the sequence numbers at a PDCP layer or via an RRC message.

Optionally, the RAN may further send, to the UE, length information of the data packets corresponding to the sequence numbers.

For details of S506, refer to descriptions of a related operation in the method 300. Details are not described herein again.

S507: The UE sends, to the RAN, an ACK feedback for the sequence numbers carried in the N data packets.

Optionally, the UE may further send, to the RAN, the length information of the data packets corresponding to the ACK feedback and/or first indication information.

For details about the first indication information, refer to the foregoing descriptions. Details are not described herein again.

S508: The RAN sends the ACK feedback to the AS.

Specifically, the RAN sends the ACK feedback to the UPF, and then the UPF sends the ACK feedback to the AS.

Optionally, the RAN may further send, to the AS, the length information of the data packets corresponding to the ACK feedback and/or the first indication information.

In conclusion, in the method provided in this application, the UPF may include the priority information in the data packet of the media stream. When the network resource of the RAN cannot satisfy the transmission requirement of the UE, the RAN may drop the data packet with the lower priority based on the priority information of the data packet, to ensure transmission of a data packet with a higher priority and ensure basic media viewing experience of a user. In addition, the RAN sends the sequence number of the dropped data packet to the UE, so that the UE can perform ACK feedback on a data packet that is not received by the UE, to avoid retransmission of the data packet dropped by the RAN on a server side, and further ensure transmission of the data packet with the higher priority.

Figure 6:
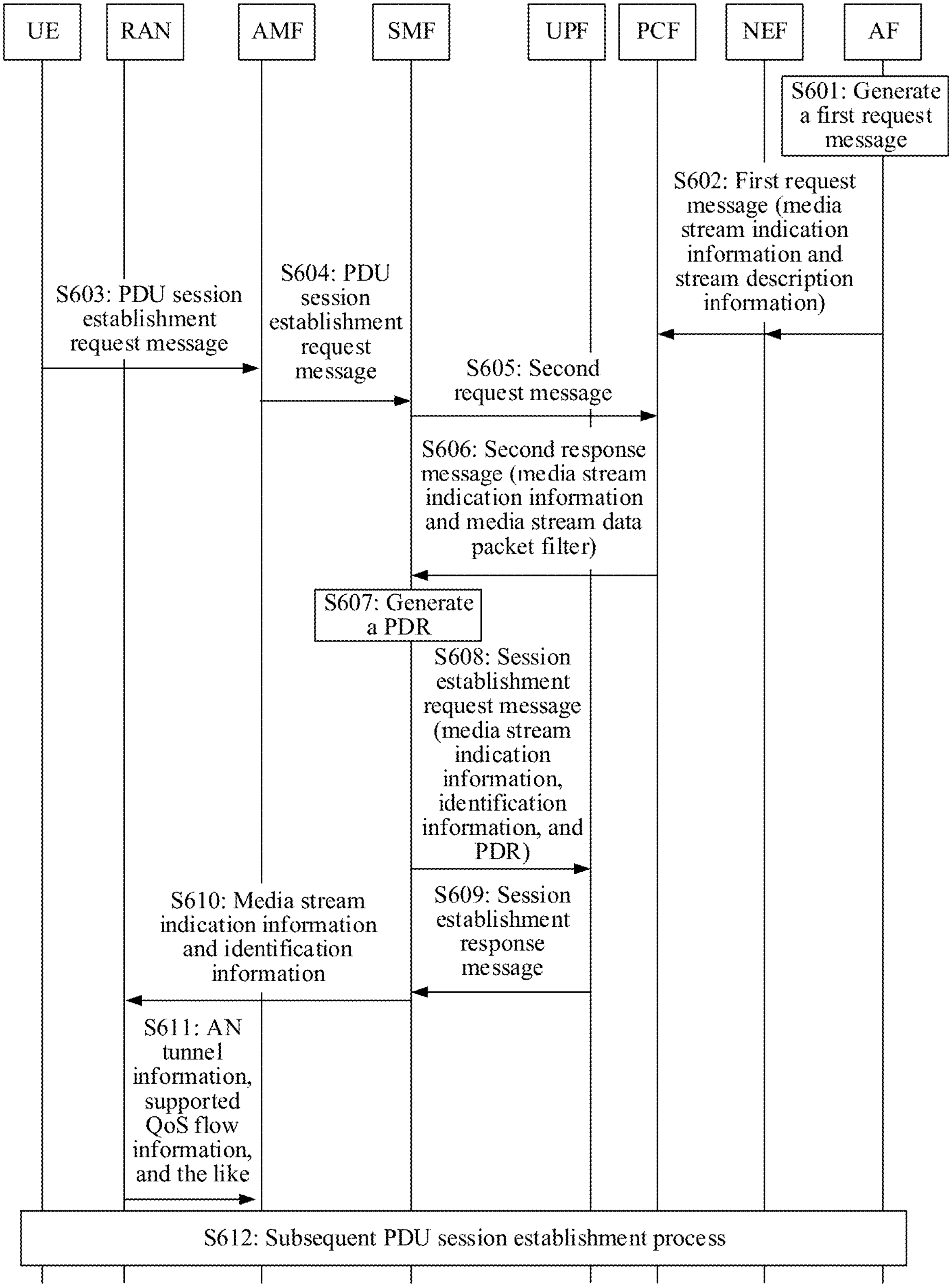
FIG. 6 is a schematic diagram of another PDU session establishment process according to this application.

FIG. 6 is a schematic diagram of another PDU session establishment process. The process may be a process of establishing a PDU session when a UDP transport protocol is used for a media stream. However, this is not limited in this application. After the PDU session is established through the process shown in FIG. 6, a data packet of the media stream may be transmitted through a process shown in FIG. 7. A method 700 shown in FIG. 7 corresponds to a solution in which no sequence number is carried in a data packet. The following describes operations in the process shown in FIG. 6.

S601: An AF generates a first request message.

S602: The AF sends the first request message to a PCF through an NEF. Accordingly, the PCF receives the first request message from the AF through the NEF. The NEF is optional. If the AF is in a trusted zone of a network, the NEF is not required. Otherwise, the AF needs to interact with the PCF through the NEF.

The first request message includes media stream indication information and stream description information.

The stream description information describes a data feature of one data stream. In this application, the data stream is the media stream. For example, the stream description information may include one or more of the following: an IP address of a terminal device, a transport layer port of the terminal device, an IP address of a server, a transport layer port of the server, and a transport layer protocol type.

The media stream indication information indicates that the data stream described by the stream description information is the media stream. Further, the media stream indication information may further indicate an access network element to drop a data packet with a lower priority in the media stream when a network resource of the access network element cannot satisfy a transmission requirement of the terminal device.

For example, the first request message may be an AF request message, and a specific service message may be an Nnef_ServiceParameter_Create/Update/Delete request.

S603: The UE sends a PDU session establishment request message to an AMF.

Accordingly, the AMF receives the PDU session establishment request message from the UE.

Specifically, when establishing the PDU session, the UE sends the PDU session establishment request message to the AMF side. The PDU session establishment request message is included in a NAS message sent by the UE to the AMF.

S604: The AMF sends the received PDU session establishment request message to an SMF.

For example, the AMF may send the received PDU session establishment request message to the SMF via an Nsmf_PDUSession_CreateSMContext service, to establish a PDU

S605: After receiving the PDU session establishment request message, the SMF may send a second request message to the PCF. Accordingly, the PCF receives the second request message from the SMF.

The second request message is used to initiate session management policy association establishment, to request to establish session management policy association between the SMF and the PCF.

S606: The PCF sends a second response message to the SMF. Accordingly, the SMF receives the second response message from the PCF.

After receiving the second request message, the PCF may return, to the SMF, the media stream indication information and a media stream data packet filter that are from the AF. In addition, the PCF may further send a PCC rule of the PDU session to the SMF.

S607: The SMF generates a PDR based on the media stream indication information and the media stream data packet filter.

The PDR is used to detect the media stream described by the stream description information.

S608: The SMF sends a session establishment request message to a UPF.

The session establishment request message may include the media stream indication information, identification information, and the PDR. The identification information indicates a priority indicated by priority information carried in the data packet of the media stream.

It should be understood that after subsequently receiving the data packet of the media stream, the UPF may include, in the data packet based on the identification information, the priority information indicating the priority of the data packet.

For example, the session establishment request message may be an N4 session establishment request message. N4 is an interface between the SMF and the UPF.

S609: The UPF sends a session establishment response message to the SMF.

For example, the session establishment response message may be an N4 session establishment response message.

S610: The SMF sends the media stream indication information and the identification information to a RAN.

For example, the SMF may include the media stream indication information and the identification information in an N2 SM message, and send the N2 SM message to the AMF side via an Namf_Communication_N1N2MessageTransfer service. Then, the AMF sends, to the RAN side via an N2 PDU session request (PDU Session Request) service, the N2 SM message that is sent to the RAN.

After receiving the information sent by the SMF, the RAN may store the information, and perform corresponding processing after subsequently receiving the data packet of the media stream.

It should be understood that a sequence of S610 and S611 is not limited in this application.

S611: The RAN notifies the AMF of corresponding AN tunnel information, supported QoS flow information, and the like.

For example, the RAN may use an N2 PDU session response service to notify the AMF of the corresponding AN tunnel information, the supported QoS flow information, and the like.

S612: Perform a subsequent PDU session establishment process.

For the subsequent PDU session establishment process, refer to a conventional technology, for example, operations 15 to 21 in the PDU session establishment process shown in Figure 4.3.2.2.1-1 in TS 23.502. Details are not described in this specification again.

In conclusion, based on the PDU session establishment process provided in this application, in the PDU session establishment process, the AF may send information related to the media stream to the PCF, and the PCF interacts with the SMF, so that the SMF can send corresponding information of the media stream to the UE/RAN/UPF during session establishment, to ensure that the UE/RAN/UPF can subsequently perform corresponding optimization on the media stream described by the stream description information provided by the AF, so as to ensure media stream service experience of a user.

Figure 7:
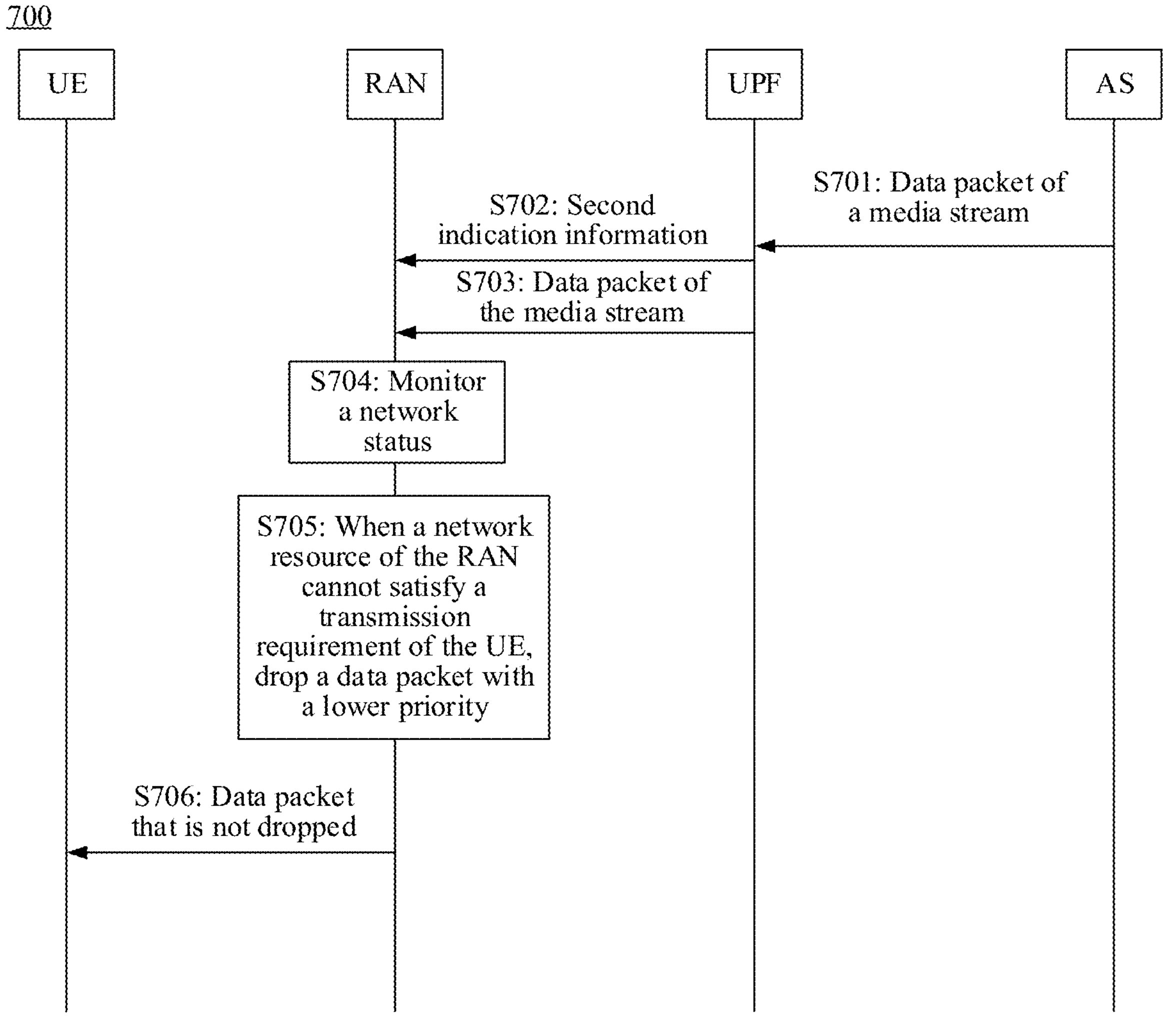
FIG. 7 is a schematic flowchart of a method for transmitting a data packet of a media stream according to this application.

FIG. 7 is another specific embodiment of a method for transmitting a data packet of a media stream according to this application. The following describes operations in the method 700 shown in FIG. 7.

S701: An AS sends a data packet of a media stream described by stream description information.

Optionally, the data packet may further carry type information. For example, a TCP/IP header of the data packet may carry the type information. The type information indicates whether the data packet corresponds to an I frame, a P frame, or a B frame in one GOP, and may further indicate a sequence number of the frame in the GOP corresponding to the data packet. Alternatively, the type information indicates whether the data packet is background stream data or foreground stream data. Alternatively, the type information indicates whether the data packet is base layer data or enhancement layer data.

Optionally, the data packet may further carry priority information. For example, the TCP/IP header of the data packet may carry the priority information. The priority information indicates a priority of the data packet. As described above, for a manner in which the AS determines the priority of the data packet, refer to a manner in which the UPF determines the priority of the data packet.

S702: After detecting that the received data packet is the data packet of the media stream, the UPF sends second indication information to a RAN. Accordingly, the RAN receives the second indication information.

In one manner, the UPF may send the second indication information in a control plane manner. For example, the UPF may report the second indication information through an N4 session, and then an SMF sends the second indication information to the RAN via an N2 SM message.

In another manner, the UPF may send the second indication information in a data plane manner. For example, when receiving the $1^{st}$ data packet of the media stream, the UPF may include the second indication information in a GTP layer of the $1^{st}$ data packet, and send the second indication information to the RAN.

S703: The UPF sends the data packet to the RAN.

This operation is the same as S503. Refer to S503.

S704: After receiving the second indication information, the RAN starts to monitor a current network status.

Specifically, after receiving the second indication information, the RAN starts to detect whether a network resource of the RAN can satisfy a transmission requirement of UE.

S705: When the network resource of the RAN cannot satisfy the transmission requirement of the UE, the RAN drops a data packet with a lower priority.

For details of this operation, refer to S320. Details are not described herein again.

It is to be noted that, if the data packet received by the RAN does not carry the priority information, the RAN may determine the priority of the data packet. For a specific determining manner, refer to the foregoing described manner in which the UPF determines the priority of the data packet.

S706: The RAN sends a data packet in the M data packets that is not dropped to the UE.

In conclusion, in the method provided in this application, the UPF may include the priority information in the data packet of the media stream. When the network resource of the RAN cannot satisfy the transmission requirement of the UE, the RAN may drop the data packet with the lower priority based on the priority information of the data packet, to ensure transmission of a data packet with a higher priority and ensure basic media viewing experience of a user.

It should be understood that the solutions in embodiments of this application may be properly combined for use, and explanations or descriptions of terms in embodiments may be cross-referenced or explained in embodiments. This is not limited.

It should be further understood that sequence numbers of the foregoing processes do not mean execution sequences in embodiments of this application. The execution sequences of the processes should be determined based on functions and internal logic of the processes. Numbers or sequence numbers in the foregoing processes are merely for differentiation for ease of description, and should not constitute any limitation on an embodiment process of embodiments of this application.

The foregoing describes, in detail with reference to FIG. 2 to FIG. 7, the methods provided in embodiments of this application. The following describes, in detail with reference to FIG. 8 to FIG. 10, apparatuses provided in embodiments of this application.

Figure 8:
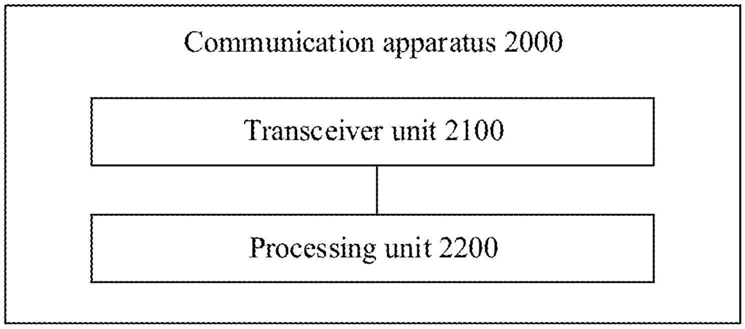
FIG. 8 is a schematic block diagram of a communication apparatus according to this application.

FIG. 8 is a schematic block diagram of a communication apparatus according to an embodiment of this application. As shown in FIG. 8, the communication apparatus 1000 may include a transceiver unit 1100 and a processing unit 1200.

The transceiver unit 2100 may include a sending unit and/or a receiving unit. The transceiver unit 2100 may be a transceiver (including a transmitter and/or a receiver), an input/output interface (including an input interface and/or an output interface), a pin, a circuit, or the like. The transceiver unit 2100 may be configured to perform a sending operation and/or a receiving operation in the foregoing method embodiments.

The processing unit 2200 may be a processor (which may include one or more processors), a processing circuit having a processor function, or the like, and may be configured to perform a operation other than the sending operation and the receiving operation in the foregoing method embodiments.

Optionally, the communication apparatus may further include a storage unit. The storage unit may be a memory, an internal storage unit (for example, a register or a cache), an external storage unit (for example, a read-only memory or a random-access memory), or the like. The storage unit is configured to store instructions, and the processing unit 2200 may execute the instructions stored in the storage unit, so that the communication apparatus performs the foregoing methods.

In a design, the communication apparatus 2000 may correspond to the access network element (for example, the RAN) in the foregoing method embodiments, and may perform an operation performed by the access network element.

Specifically, the transceiver unit 2100 is configured to receive M data packets of a media stream from a user plane network element, where M is a positive integer, and each of the M data packets carries a sequence number representing a sending sequence of the data packet. The processing unit 2200 is configured to drop N data packets in the M data packets when a network resource of the apparatus 2000 cannot satisfy a transmission requirement of a terminal device, where N≤M, N is an integer, and priorities of the N data packets are lower than priorities of other data packets in the M data packets. The transceiver unit 2100 is further configured to send, to the terminal device, a data packet in the M data packets that is not dropped and sequence numbers carried in the N data packets. The transceiver unit 2100 is further configured to receive, from the terminal device, an acknowledge ACK feedback for the sequence numbers carried in the N data packets.

Optionally, the transceiver unit 2100 is further configured to receive, from the terminal device, first indication information for the sequence numbers carried in the N data packets, where the first indication information indicates that the terminal device receives no data packet corresponding to the sequence number.

Optionally, each of the M data packets carries priority information.

Optionally, the N data packets include one or more of the following: a data packet corresponding to last Q B frames or P frames in a group of pictures GOP, a data packet corresponding to background stream data in the media stream, and a data packet corresponding to enhancement layer data in the media stream, where Q is a positive integer.

Optionally, the transceiver unit 2100 is further configured to receive second indication information from the user plane network element or a session management network element, where the second indication information indicates that the user plane network element has received the media stream. The processing unit 2200 is further configured to monitor, based on the second indication information, whether the network resource of the apparatus 2000 can satisfy the transmission requirement of the terminal device.

Optionally, the transceiver unit 2100 is further configured to: receive a first message from the session management network element, where the first message includes media stream indication information, identification information, and transport layer indication information, the media stream indication information indicates the apparatus 2000 to drop a data packet with a lower priority in the media stream when detecting that the network resource of the apparatus 2000 cannot satisfy the transmission requirement of the terminal device, the identification information is used by the apparatus 2000 to determine a priority of a received data packet of the media stream, and the transport layer indication information indicates the apparatus 2000 to send, after dropping the data packet with the lower priority in the media stream, a sequence number representing a sending sequence of the dropped data packet to the terminal device.

It should be understood that the transceiver unit 2100 and the processing unit 2200 may further perform other operations performed by the access network element in the foregoing method embodiments. Details are not described herein again.

In a design, the communication apparatus 2000 may correspond to the user plane network element (for example, the UPF) in the foregoing method embodiments, and may perform an operation performed by the user plane network element.

Specifically, the processing unit 2200 is configured to determine a priority of a received data packet of a media stream in the media stream based on the following information: whether the data packet is a data packet corresponding to last Q B frames or P frames in a group of pictures GOP, whether the data packet is a data packet corresponding to background stream data in the media stream, and whether the data packet is a data packet corresponding to enhancement layer data in the media stream, where Q is a positive integer. The transceiver unit 2100 is configured to send, to an access network element, the data packet carrying priority information.

Optionally, the data packet further carries a sequence number representing a sending sequence of the data packet.

Optionally, the transceiver unit 2100 is further configured to send second indication information to the access network element, where the second indication information indicates that the transceiver unit 2100 has received the media stream, so that the access network element monitors whether a network resource of the access network element can satisfy a transmission requirement of a terminal device.

Optionally, the transceiver unit 2100 is further configured to receive media stream indication information, identification information, and a PDR from a session management network element, where the media stream indication information indicates the access network element to drop a data packet with a lower priority in the media stream when the network resource of the access network element cannot satisfy the transmission requirement of the terminal device, the identification information is used by the access network element to determine a priority of a received data packet of the media stream, and the PDR is used by the apparatus 2000 to detect the media stream.

It should be understood that, the transceiver unit 2100 and the processing unit 2200 may further perform other operations performed by the user plane network element in the foregoing method embodiment. Details are not described herein again.

In a design, the communication apparatus 2000 may correspond to the terminal device in the foregoing method embodiments, and may perform an operation performed by the terminal device.

Specifically, the transceiver unit 2100 is configured to receive, from an access network element, a sequence number representing a sending sequence of a data packet of a media stream. The transceiver unit 2100 is further configured to: if the terminal device does not receive a data packet corresponding to the sequence number, send an acknowledge ACK feedback to the access network element.

Optionally, the transceiver unit 2100 is further configured to send first indication information, where the first indication information indicates that the terminal device receives no data packet.

It should be understood that the transceiver unit 2100 and the processing unit 220 may further perform other operations performed by the terminal device in the foregoing method embodiments. Details are not described herein again.

In addition, the communication apparatus 2000 may further correspond to another network element in the foregoing method embodiments, for example, the application network element (for example, an AF or an AS), the policy control network element (for example, a PCF), or the session management network element (for example, an SMF), and may perform an operation performed by the corresponding network element.

For example, when the communication apparatus 2000 may correspond to the application network element in the foregoing method embodiments, the processing unit 2200 is configured to generate a first request message. The transceiver unit 2100 is configured to send the first request message to a policy control network element, where the first request message includes media stream indication information and stream description information, the media stream indication information indicates an access network element to drop a data packet with a lower priority in a media stream when a network resource of the access network element cannot satisfy a transmission requirement of a terminal device, and the stream description information describes a data feature of the media stream.

For example, when the communication apparatus 2000 may correspond to the policy control network element in the foregoing method embodiments, the transceiver unit 2100 is configured to receive a first request message from an application network element, where the first request message includes media stream indication information and stream description information, the media stream indication information indicates an access network element to drop a data packet with a lower priority in a media stream when a network resource of the access network element cannot satisfy a transmission requirement of a terminal device, and the stream description information describes a data feature of the media stream. The transceiver unit 2100 is further configured to send a second response message to the session management network element, where the second response message includes the media stream indication information and a media stream data packet filter, the media stream indication information and the media stream data packet filter are used by the session management network element to generate a PDR, and the PDR is used by a user plane network element to detect the media stream.

For example, when the communication apparatus 2000 may correspond to the session management network element in the foregoing method embodiments, the transceiver unit 2100 is configured to receive a second response message from a policy control network element, where the second response message includes media stream indication information and a media stream data packet filter, the media stream indication information indicates an access network element to drop a data packet with a lower priority in a media stream when a network resource of the access network element cannot satisfy a transmission requirement of a terminal device, the media stream indication information and the media stream data packet filter are used by the communication apparatus 2000 to generate a PDR, and the PDR is used by a user plane network element to detect the media stream. The transceiver unit 2100 is further configured to send a session establishment request message to the user plane network element, where the session establishment request message includes the media stream indication information, identification information, and the PDR, and the identification information indicates a priority indicated by priority information carried in a data packet of the media stream. The transceiver unit 2100 is further configured to send the media stream indication information and the identification information to the access network element through an access and mobility management network element.

It should be understood that division of the foregoing units is merely function division, and there may be another division method during actual implementation.

It should be further understood that the processing unit may be implemented by using hardware, may be implemented by using software, or may be implemented by using a combination of software and hardware.

Figure 9:
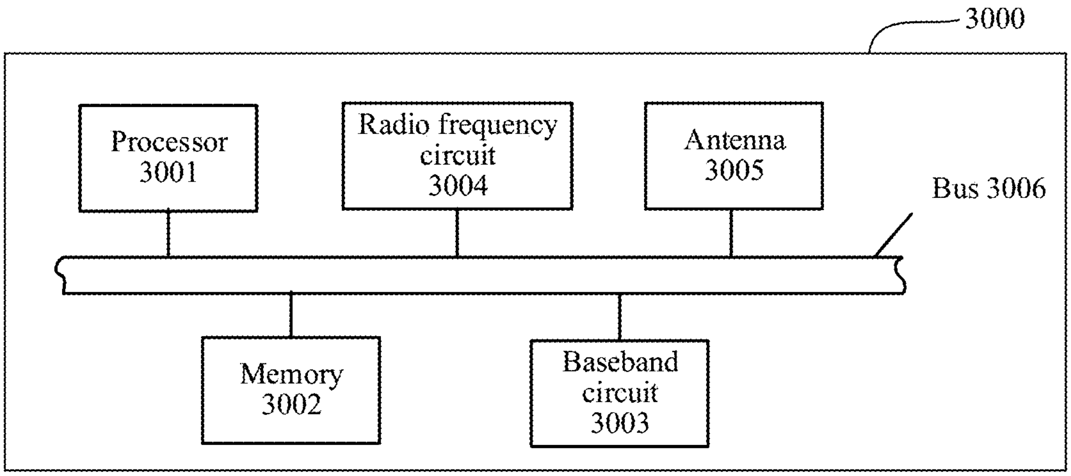
FIG. 9 is a schematic diagram of a structure of another communication apparatus according to this application.

FIG. 9 is a schematic diagram of a structure of a communication apparatus according to this application. As shown in FIG. 9, the communication apparatus 3000 may implement functions that can be implemented by any network element in any one of the foregoing method embodiments.

The communication apparatus 3000 may include a processor 3001. The processor 3001 may also be referred to as a processing unit, and may implement a specific control function. The processor 3001 may be configured to control the communication apparatus 3000, execute a software program, and process data of the software program.

In an optional design, the processor 3001 may also store instructions and/or data. The instructions and/or data may be run by the processor 3001, to enable the communication apparatus 3000 to perform the method described in the foregoing method embodiments.

Optionally, the communication apparatus 3000 may include a memory 3002, and the memory 3002 may store instructions. The instructions may be run on the processor, to enable the communication apparatus 3000 to perform the method described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the communication apparatus 3000 may include a baseband circuit 3003. The baseband circuit 3003 is mainly configured to perform baseband processing.

Optionally, the communication apparatus 3000 may include a radio frequency circuit 3004. The radio frequency circuit 3004 is mainly configured to receive and send a radio frequency signal and perform conversion between a radio frequency signal and a baseband signal, for example, configured to send the BAR frame in the foregoing method embodiments. The radio frequency circuit 3004 may also be referred to as a transceiver unit, a transceiver, a transceiver circuit, or the like.

Optionally, the communication apparatus 3000 may include an antenna 3005. The antenna 3005 is mainly configured to send and receive a signal.

Optionally, the communication apparatus 3000 may include a bus 3006, configured to connect parts of the communication apparatus 3000, for example, the processor 3001, the memory 3002, the baseband circuit 3003, the radio frequency circuit 3004, and the antenna 3005.

Figure 10:
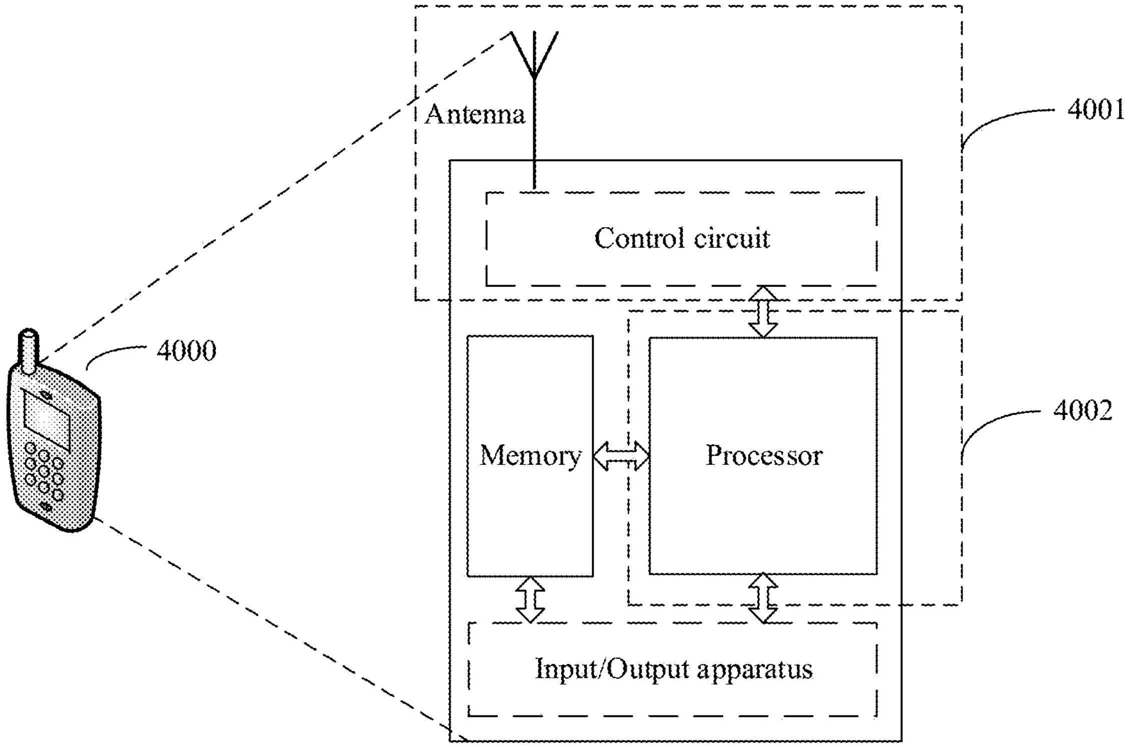
FIG. 10 is a schematic diagram of a structure of a terminal device according to this application.

FIG. 10 is a schematic diagram of a structure of a communication apparatus 4000 according to this application. For ease of description, FIG. 10 shows only main components of the communication apparatus 4000. The communication apparatus 4000 may be configured to implement functions of the terminal device according to any one of the foregoing method embodiments.

As shown in FIG. 10, the communication apparatus 4000 includes a processor and a memory.

Optionally, the communication apparatus 4000 includes a control circuit, an antenna, and an input/output apparatus.

The processor is mainly configured to: process a communication protocol and communication data, control the entire communication apparatus 4000, execute a software program, and process data of the software program. For example, the processor is configured to support the communication apparatus 4000 in performing an operation performed by the terminal device described in the foregoing method embodiments. The memory is mainly configured to store the software program and data. The control circuit is mainly configured to perform conversion between a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to: receive data input by a user and output data to the user.

After the communication apparatus 4000 is powered on, the processor may read the software program in the storage unit, interpret and execute instructions of the software program, and process the data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, through the antenna, a radio frequency signal in an electromagnetic wave form. When data is sent to the communication apparatus 4000, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 10 shows only one memory and one processor. In an actual communication apparatus 4000, there may be a plurality of processors and memories. The memory may also be referred to as a storage medium, a storage device, or the like. This is not limited in embodiments of this application.

In an optional embodiment, the processor may include a baseband processor and a central processing unit. The baseband processor is mainly configured to process the communication protocol and the communication data, and the central processing unit is mainly configured to: control the entire communication apparatus 4000, execute the software program, and process the data of the software program. The processor in FIG. 10 integrates functions of the baseband processor and the central processing unit. A person skilled in the art may understand that the baseband processor and the central processing unit may alternatively be processors independent of each other, and are interconnected by using a technology such as a bus. A person skilled in the art can understand that the communication apparatus 4000 may include a plurality of baseband processors to adapt to different network standards, the communication apparatus 4000 may include a plurality of central processing units to enhance a processing capability of the communication apparatus, and components of the communication apparatus 4000 may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program, and the processor executes the software program to implement a baseband processing function.

For example, in this embodiment of this application, the antenna that has receiving and sending functions and the control circuit may be considered as a transceiver unit 4001 of the communication apparatus 4000, and the processor that has a processing function may be considered as a processing unit 4002 of the communication apparatus 4000. As shown in FIG. 10, the communication apparatus 4000 includes a transceiver unit 4001 and a processing unit 4002. The transceiver unit may also be referred to as a transceiver, a transceiver apparatus, or the like. Optionally, a device that is in the transceiver unit 4001 and that is configured to implement a receiving function may be considered as a receiving unit, and a device that is in the transceiver unit 4001 and that is configured to implement a sending function may be considered as a sending unit. In other words, the transceiver unit 4001 includes the receiving unit and the sending unit. For example, the receiving unit may also be referred to as a receiver, or a receiving circuit, and the sending unit may also be referred to as a transmitter, or a transmitting circuit.

It is to be noted that, the processor in embodiments of this application may be an integrated circuit chip, and has a signal processing capability. In an embodiment process, operations in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a micro controller unit (MCU), a programmable logic device (PLD), or another integrated chip. It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It is to be noted that the memory of the systems and methods described in this specification includes but is not limited to these memories and any memory of another proper type.

According to the methods provided in embodiments of this application, this application further provides a computer program product. The computer program product includes computer program code. When the computer program code is run on a computer, the computer is enabled to perform an operation performed by any network element (for example, the access network element, the user plane network element, or the terminal device) in any one of the foregoing method embodiments.

According to the methods provided in embodiments of this application, this application further provides a computer-readable medium. The computer-readable medium stores program code. When the program code is run on a computer, the computer is enabled to perform an operation performed by any network element (for example, the access network element, the user plane network element, or the terminal device) in the foregoing method embodiments.

According to the methods provided in embodiments of this application, this application further provides a system, including one or more network elements according to any one of the foregoing method embodiments.

An embodiment of this application further provides a communication apparatus. The communication apparatus includes a processor and an interface. The processor is configured to perform the method according to any one of the foregoing method embodiments.

It should be understood that the communication apparatus may be a chip. For example, the processing apparatus may be a field programmable gate array (FPGA), may be a general-purpose processor, a digital signal processor (DSP), an application-specific integrated circuit (ASIC), the field programmable gate array (FPGA) or another programmable logic device, a discrete gate, a transistor logic device, or a discrete hardware component, may be a system on chip (SoC), may be a central processing unit (CPU), may be a network processor (NP), may be a digital signal processing circuit (DSP), may be a micro controller unit (MCU), or may be a programmable logic device (PLD) or another integrated chip. It may implement or perform the methods, the operations, and logical block diagrams that are disclosed in embodiments of this application. The general-purpose processor may be a microprocessor, or the processor may be any conventional processor or the like. Operations of the methods disclosed with reference to embodiments of this application may be directly executed and completed by a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It is to be noted that the memory of the systems and methods described in this specification includes but is not limited to these memories and any memory of another proper type.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, all or a part of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid-state drive (SSD)), or the like.

The network device and the terminal device in the foregoing apparatus embodiments completely correspond to the network device and the terminal device in the method embodiments. A corresponding module or unit performs a corresponding operation. For example, the communication unit (e.g., the transceiver) performs a receiving operation or a sending operation in the method embodiments, and an operation other than the sending operation and the receiving operation may be performed by the processing unit (e.g., the processor). For a function of a specific unit, refer to a corresponding method embodiment. There may be one or more processors.

Terminologies such as "component", "module", and "system" used in this specification indicate computer-related entities, hardware, firmware, combinations of hardware and software, software, or software being executed. For example, a component may be but is not limited to a process that runs on a processor, a processor, an object, an executable file, an execution thread, a program, or a computer. As illustrated by using figures, both a computing device and an application that runs on the computing device may be components. One or more components may reside within a process or an execution thread, and a component may be located on one computer or distributed between two or more computers. In addition, these components may be executed from various computer-readable media that store various data structures. For example, the components may communicate by using a local or remote process based on a signal having one or more data packets (for example, data from two components interacting with another component in a local system, in a distributed system, or across a network such as the Internet interacting with another system by using the signal).

It should be understood that, an “embodiment” mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments by using any appropriate manner.

It should be understood that, in embodiments of this application, numbers “first”, “second”, and the like are merely used to distinguish between different objects, for example, distinguish between different network devices, and do not constitute a limitation on the scope of embodiments of this application. Embodiments of this application are not limited thereto.

It should be further understood that, in this application, both “when” and “if” mean that a network element performs corresponding processing in an objective situation, but do not constitute a limitation on time, do not require that the network element has a determining action during embodiment, and do not mean other limitations either.

It should be further understood that, in this application, “at least one” means one or more, and “a plurality of” means two or more.

It should be further understood that, in embodiments of this application, “B corresponding to A” indicates that B is associated with A, and B may be determined based on A. However, it should be further understood that determining B based on A does not mean that B is determined based only on A. B may alternatively be determined based on A and/or other information.

It should also be understood that the term “and/or” in this specification describes only an association relationship for describing associated objects and indicates that three relationships may exist. For example, A and/or B may indicate the following three cases: Only A exists, both A and B exist, and only B exists. In addition, the character “/” in this specification generally indicates an “or” relationship between the associated objects.

Unless otherwise specified, an expression used in this application similar to an expression that “an item includes one or more of the following: A, B, and C” usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is “the item includes at least one of the following: A, B, . . . , and X”, in other words, more elements are included in the expression, a case to which the item is applicable may also be obtained according to the foregoing rule.

It may be understood that, in embodiments of this application, the terminal device and/or the network device may perform some or all operations in embodiments of this application. These operations or operations are merely examples. In embodiments of this application, other operations or variations of various operations may be further performed. In addition, the operations may be performed in a sequence different from a sequence presented in embodiments of this application, and not all the operations in embodiments of this application may be necessarily to be performed.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and there may be another division during actual embodiment. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a data packet of a media stream, comprising:
receiving, by a user plane network element, indicating information from a session management network element, the indicating information indicating the user plane network element to add priority information of an image frame in the media stream to one or more data packets corresponding to the image frame;
determining, by the user plane network element, the priority information of the image frame in the media stream;
adding, by the user plane network element in response to the indicating information, the priority information to the one or more data packets corresponding to the image frame, wherein the priority information causing an access network device to discard the image frame at the access network device when a network resource cannot meet a transmission requirement; and
sending the one or more data packets corresponding to the image frame to the access network device.

2. The method according to claim 1, wherein the priority information is included in a general packet radio service (GPRS) tunneling protocol (GTP) layer of the one or more data packets.

3. The method according to claim 1, wherein the receiving the indicating information from the session management network element comprises:
receiving a session establishment request message from the session management network element, wherein the session establishment request message comprises the indicating information.

4. The method according to claim 3, wherein the session establishment request message is an N4 session establishment request message.

5. The method according to claim 1, wherein the determining priority information of an image frame comprises:
receiving a data packet corresponding to the image frame, and obtaining the priority information from a header of the data packet; or
determining the priority information by the user plane network element.

6. An apparatus for transmitting a data packet of a media stream, comprising:
a memory storing one or more instructions, and
at least one processor coupled with the memory, which when the one or more instructions are executed by the at least one processor, the apparatus is configured to:
receive indicating information from a session management network element, the indicating information indicating a user plane network element to add priority information of an image frame in the media stream to one or more data packets corresponding to the image frame, the apparatus comprising the user plane network element,
determine the priority information of the image frame in the media stream, and
add, in response to the indicating information, the priority information to the one or more data packets corresponding to the image frame, wherein the priority information causing an access network device to discard the image frame at the access network device when a network resource cannot meet a transmission requirement; and
a transceiver, coupled with the at least one processor, configured to:
send the one or more data packets corresponding to the image frame to the access network device.

7. The apparatus according to claim 6, wherein the priority information is included in a general packet radio service (GPRS) tunneling protocol (GTP) layer of the one or more data packets.

8. The apparatus according to claim 6, further comprising:
the transceiver further configured to receive a session establishment request message from the session management network element, wherein the session establishment request message comprises the indicating information.

9. The apparatus according to claim 8, wherein the session establishment request message is an N4 session establishment request message.

10. The apparatus according to claim 6, further comprising:
the transceiver further configured to receive a data packet corresponding to the image frame, and obtaining the priority information from a header of the data packet; or
the processor further configured to determine the priority information by the user plane network element.

11. A non-transitory computer readable storage medium, having instructions stored thereon, which when executed by a processing system of an apparatus, cause the apparatus to:
receive indicating information from a session management network element, the indicating information indicating a user plane network element to add priority information of an image frame in a media stream to one or more data packets corresponding to the image frame, the apparatus comprising the user plane network element;
determine the priority information of the image frame in the media stream;
add, in response to the indicating information, the priority information to the one or more data packets corresponding to the image frame, wherein the priority information causing an access network device to discard the image frame at the access network device when a network resource cannot meet a transmission requirement; and
send the one or more data packets corresponding to the image frame to the access network device.

12. The non-transitory computer readable storage medium according to claim 11, wherein the priority information is included in a general packet radio service (GPRS) tunneling protocol (GTP) layer of the one or more data packets.

13. The non-transitory computer readable storage medium according to claim 11, wherein the apparatus to receive the indicating information from the session management network element further comprises the apparatus to:
receive a session establishment request message from the session management network element, wherein the session establishment request message comprises the indicating information.

14. The non-transitory computer readable storage medium according to claim 13, wherein the session establishment request message is an N4 session establishment request message.

15. The non-transitory computer readable storage medium according to claim 11, wherein the apparatus to determine priority information of an image frame further comprises the apparatus to:

receive a data packet corresponding to the image frame, and obtain the priority information from a header of the data packet; or determine the priority information by the user plane network element.

* * * * *